(12) United States Patent
Yiu et al.

(10) Patent No.: US 7,350,005 B2
(45) Date of Patent: Mar. 25, 2008

(54) HANDLING INTERRUPTS IN A SYSTEM HAVING MULTIPLE DATA PROCESSING UNITS

(75) Inventors: Man Cheung Joseph Yiu, Maidenhead (GB); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 1014 days.

(21) Appl. No.: 10/444,077

(22) Filed: May 23, 2003

(65) Prior Publication Data

US 2004/0236879 A1     Nov. 25, 2004

(51) Int. Cl.
   *G06F 13/26* (2006.01)
(52) U.S. Cl. ................................. 710/264; 710/262
(58) Field of Classification Search ............. 710/260, 710/262, 264
   See application file for complete search history.

(56) References Cited

U.S. PATENT DOCUMENTS 5,918,057 A    6/1999  Chou et al.

*Primary Examiner*—Clifford Knoll
(74) *Attorney, Agent, or Firm*—Nixon & Vanderhye P.C.

(57) ABSTRACT

An interrupt controller is provided for processing interrupt requests in a system having a plurality of data processing units operable to service those interrupt requests, each interrupt request having an associated priority level. The interrupt controller comprises request logic operable to receive an indication of unserviced interrupt requests, to apply predetermined criteria to determine which of said plurality of data processing units are candidate data processing units for servicing at least one of said unserviced interrupt requests, and to issue a request signal to each said candidate data processing unit. Priority encoding logic is operable to determine a highest priority unserviced interrupt request based on the associated priority levels of the unserviced interrupt requests. Further, handshake logic is operable to receive acknowledgement signals associated with said candidate data processing units replying to said request signals issued by the request logic, upon receipt of a first acknowledgement signal, the handshake logic being operable to allocate to the candidate data processing unit associated with that first acknowledgement signal the highest priority unserviced interrupt request as indicated by the priority encoding logic. By this approach, the highest priority unserviced interrupt request will be allocated to the data processing unit whose associated acknowledgement signal is first received by the handshake logic, and hence this increases the speed with which that highest priority interrupt request is serviced.

36 Claims, 12 Drawing Sheets

HANDLING INTERRUPTS IN A SYSTEM HAVING MULTIPLE DATA PROCESSING UNITS

BACKGROUND OF THE INVENTION

1. Field of the Invention

The present invention relates to techniques for handling interrupts in a system having multiple data processing units, also referred to herein as a multi-processor system. It will be appreciated that the multiple data processing units, also referred to herein as processors, may take a variety of forms, for example CPUs, Direct Memory Access (DMA) controllers, etc, and indeed may comprise a combination of different processing devices.

2. Description of the Prior Art

When devices within a data processing system require a processor within the data processing system, typically the CPU, to perform a service routine, they will typically issue an interrupt request to that processor. When an interrupt request is received by the processor whilst it is executing a main process, the processor will typically temporarily interrupt the main process under execution, and instead execute the Interrupt Service Routine (ISR) specified by the interrupt request. The devices may be on the same chip as the processor, or may be off-chip. In a typical data processing system there will often be multiple devices which can issue such interrupt requests, and since the processor cannot simultaneously execute the ISRs defined by the plurality of interrupt requests, it is known to provide an interrupt controller for receiving the various interrupt requests, and prioritising between them. Hence, interrupt requests from certain devices (for example a network interface) can be given higher priority than interrupt requests from other devices (for example a keyboard).

In a vectored interrupt controller (VIC) the controller will store a list of vector addresses for ISRs that are associated with each interrupt source, i.e. each device that can issue an interrupt request. Hence, when an interrupt request is received, the VIC can pass the exact location of the associated ISR code to the processor to enable the processor to begin execution of that ISR.

As data processing systems become more complex, it is known to provide a plurality of processors within the data processing system for sharing the data processing load. Hence, in a typical multi-processor system, the operating system and the applications will be multi-threaded. In such systems, it is clear that the interrupt request servicing could also be distributed amongst the multiple processors. However, one problem that occurs is how to design an interrupt controller that can make effective use of the multiple processors within the system when processing interrupt requests.

U.S. Pat. No. 5,918,057 describes an interrupt processing technique suitable for use in an interrupt controller of a multi-processor system. For each interrupt source that can generate an interrupt request, the interrupt controller has a destination register identifying the particular processor(s) to which the corresponding interrupt request may be directed, and further includes a priority register containing information identifying the priority of the corresponding interrupt request relative to the other interrupt requests. The interrupt controller applies the received interrupt requests to a priority compare tree which serves to prioritise the received interrupt requests. A number of higher priority requests, including the highest priority request, are supplied to a destination selection circuit which includes an interrupt dispatcher which determines a processor to which the first priority interrupt request will be dispatched. This process is performed with reference to the appropriate destination register. Similar determinations are then made for the remaining identified interrupt requests, but with the corresponding destination register contents masked to prevent processors already selected to receive a higher priority interrupt from being considered for a lower priority interrupt.

Accordingly, it can be seen that the destination selection circuit attempts to determine a unique destination processor for each of the highest priority interrupt requests, such that these multiple interrupt requests can therefore be dispatched to different processors simultaneously.

Whilst such an approach can enable an increase in the throughput of interrupt requests by allowing simultaneous issue of interrupt requests, it cannot ensure that the highest priority interrupt request will necessarily be routed to the processor that will most quickly be able to service that interrupt request. For example, the highest priority interrupt request may be routed via the destination selection circuit to CPU0, whilst the next highest priority request might be routed via the destination selection circuit to CPU1. However, dependent on the processing being performed by both CPU0 and CPU1 at the time, CPU1 may be able to start servicing an interrupt request more quickly than CPU0. In this instance, it can be seen that, whilst the overall throughput of interrupt requests through the system is relatively high, the highest priority interrupt request has not been handled in the most expedient manner, since it has been routed to CPU0 rather than to CPU1.

It is an object of the present invention to provide a technique for processing interrupt requests in a multi-processor system which enables a highest priority interrupt request to be routed to the data processing unit which is able to service that interrupt request most quickly.

SUMMARY OF THE INVENTION

Viewed from a first aspect, the present invention provides an interrupt controller for processing interrupt requests in a system having a plurality of data processing units operable to service those interrupt requests, each interrupt request having an associated priority level, the interrupt controller comprising: request logic operable to receive an indication of unserviced interrupt requests, to apply predetermined criteria to determine which of said plurality of data processing units are candidate data processing units for servicing at least one of said unserviced interrupt requests, and to issue a request signal to each said candidate data processing unit; priority encoding logic operable to determine a highest priority unserviced interrupt request based on the associated priority levels of the unserviced interrupt requests; and handshake logic operable to receive acknowledgement signals associated with said candidate data processing units replying to said request signals issued by the request logic, upon receipt of a first acknowledgement signal, the handshake logic being operable to allocate to the candidate data processing unit associated with that first acknowledgement signal the highest priority unserviced interrupt request as indicated by the priority encoding logic.

In accordance with the present invention, whenever there are unserviced interrupt requests received by the interrupt controller, request logic within the interrupt controller is used to determine which of the plurality of data processing units are candidate data processing units for servicing at least one of the unserviced interrupt requests, and to issue a request signal to each candidate data processing unit. The aim is to issue a request signal to each data processing unit which may potentially be able to handle at least one of the unserviced interrupt requests.

Priority encoding logic is provided to determine a highest priority unserviced interrupt request based on the associated priority levels of those interrupt requests. This information is made available to handshake logic which is operable to receive acknowledgement signals associated with the candidate data processing units replying to the request signals issued by the request logic. When the first acknowledgement signal associated with one of those candidate data processing units is received by the handshake unit, the handshake logic is operable to allocate to that candidate data processing unit the highest priority unserviced interrupt request as indicated by the priority encoding logic.

By this approach, it can be seen that the highest priority unserviced interrupt request will be allocated to the data processing unit whose associated acknowledgement signal is first received by the handshake unit, and hence this increases the speed with which that highest priority interrupt request is serviced.

It will be appreciated that the interrupt controller will not be aware of the actual processing being performed by each data processing unit, and hence cannot determine itself which of the multiple data processing units will be able to handle the highest priority interrupt request most quickly. Hence, in accordance with the present invention, the interrupt controller is arranged to determine based on predetermined criteria which of the data processing units are candidate data processing units that might potentially be able to handle the interrupt request, and a request signal is issued to each such candidate data processing unit.

In accordance with one embodiment of the present invention, at least one of said candidate data processing units is operable to reply to said request signal by issuing a direct acknowledgement signal for receipt as one of said acknowledgement signals by the handshake logic. Hence, for any such candidate data processing unit the acknowledgement signal processed by the handshake logic is received directly from that candidate data processing unit, for example via a dedicated port provided by said interrupt controller.

However, there is no requirement for the handshake logic to receive the acknowledgement signals directly from the candidate data processing units. For example, in one embodiment, at least one of said candidate data processing units is operable to reply to said request signal by issuing to the interrupt controller an enquiry signal seeking identification of an interrupt service routine to be executed, the interrupt controller further comprising an indirect acknowledgement signal generator operable to determine which data processing unit any such enquiry signal has been issued from, and to generate an indirect acknowledgement signal associated with that data processing unit for receipt as one of said acknowledgement signals by the handshake logic. In such an embodiment, the enquiry signal may be routed to the interrupt controller in a variety of ways, and hence for example may be routed via a system bus to which the data processing units and the interrupt controller are connected.

Hence, in accordance with this embodiment, for any such candidate data processing units, the interrupt controller is itself arranged to simulate an acknowledgement signal for forwarding to the handshake logic.

It will be appreciated that in any particular embodiment, the interrupt controller may be coupled to data processing units which all generate direct acknowledgement signals, may be coupled to data processing units which all require indirect acknowledgement signals to be generated for them, or may be coupled to a mixture of either type of data processing unit.

In one embodiment, the interrupt controller further comprises a register block having a number of identifier registers operable to store the identification of an interrupt service routine to be executed, one identifier register being provided for each of said data processing units that may reply to said request signal by issuing to the interrupt controller said enquiry signal, the indirect acknowledgement signal generator being operable to determine which data processing unit said enquiry signal has been issued from by determining the identifier register specified by that enquiry signal.

By ensuring that each such candidate data processing unit is arranged to reference a different identifier register within the register block, this provides an efficient technique for the indirect acknowledgement signal generator to determine the data processing unit responsible for any particular enquiry signal, and hence enables the indirect acknowledgement signal generator to readily issue the appropriate indirect acknowledgement signal.

It will be appreciated that the handshake logic may take a variety of forms. However, in one embodiment, the handshake logic comprises a plurality of handshake units, each handshake unit being operable to receive an acknowledgement signal associated with a corresponding one of said data processing units, the handshake units being allocated relative priorities such that if more than one acknowledgement signal is received by the handshake logic at the same time, the acknowledgement signal received by the handshake unit with the higher priority is treated as the first acknowledgement signal.

Hence, in accordance with this embodiment, if more than one acknowledgement signal is received by the handshake logic in the same clock cycle, the relative priorities associated with each handshake unit dictate which acknowledgement signal is to be treated as the first acknowledgement signal, and hence which of the candidate data processing units is to be allocated to handle the highest priority unserviced interrupt request as indicated by the priority encoding logic at that time.

It should be noted that in implementations where all of the data processing units require indirect acknowledgement signals to be generated for them, then it may be possible to avoid the need to allocate relative priorities to the handshake units if it can be ensured that no more than one enquiry signal will be received by the interrupt controller at the same time. This may be possible for example if the enquiry signals are routed via a single system bus to the interrupt controller, since the arbiter for that system bus will ensure that only one data processing unit can have access to the system bus at a time, and hence only one enquiry signal can be issued to the interrupt controller at the same time.

It will be appreciated that the relative priorities allocated to the handshake units could be established in a variety of ways. For example, some prioritization logic could be used to arbitrate between multiple acknowledgement signals received at the same time by various handshake units within the handshake logic. However, in one embodiment, the plurality of handshake units are interconnected in a daisy chain arrangement in order to implement the relative priorities, such that if more than one acknowledgement signal is received by the handshake logic at the same time, the processing of the acknowledgement signals received by other than the handshake unit with the higher priority is delayed.

In accordance with this daisy chain arrangement, if one handshake unit in the daisy chain receives an acknowledgement signal associated with a corresponding data processing unit, a signal derived from that acknowledgement signal is propagated through any other handshake units lower down the daisy chain in order to suppress processing of any acknowledgement signals received by those other handshake units until a subsequent clock cycle.

Once that subsequent clock cycle is reached, then processing of the acknowledgement signal received by the handshake unit with the next highest relative priority can then begin. If at that time, the new highest priority unserviced interrupt request as indicated by the priority encoding logic is still an unserviced interrupt request that can be serviced by the candidate data processing unit associated with that acknowledgement signal, then the handshake logic can treat that delayed acknowledgement signal as the first acknowledgement signal in respect of the new highest priority unserviced interrupt request, and can accordingly allocate to the corresponding candidate data processing unit that new highest priority unserviced interrupt request.

However, if at the time an acknowledgement signal associated with a candidate data processing unit is processed by the handshake logic, no unserviced interrupt requests that could be serviced by that candidate data processing unit exist, the handshake logic is operable to issue a reject signal.

This reject signal may be used in a variety of ways. For example, if that candidate data processing unit had replied to said request signal by issuing a direct acknowledgement signal received as one of said acknowledgement signals by the handshake logic, the reject signal issued by the handshake logic may be routed to that candidate data processing unit to indicate that the direct acknowledgement signal is rejected. The receipt of this reject signal then enables the candidate data processing unit receiving it to resume normal processing.

Alternatively, if that candidate data processing unit had replied to said request signal by issuing to the interrupt controller an enquiry signal seeking identification of an interrupt service routine to be executed, the reject signal issued by the handshake unit may be used to cause a default interrupt service routine to be identified to that data processing unit which when executed by that data processing unit will cause that data processing unit to return to its state that existed prior to responding to the request signal.

Hence, irrespective of which of the above ways the reject signal is used, it can be seen that if multiple candidate data processing units reply to the request signals issued by the request logic, then even if there is no interrupt request that can be allocated to one of those candidate data processing units, a mechanism is provided for informing that candidate data processing unit that it is no longer required to service an interrupt request, thereby enabling that candidate data processing unit to resume normal operation without further delay.

It will be appreciated that if the candidate data processing unit cannot service the highest priority unserviced interrupt request (e.g. because it is already servicing an interrupt request with the same or higher priority), then there will be no unserviced interrupt requests which can be handled by that data processing unit, and accordingly the reject signal should be issued. Similarly, if no unserviced interrupt requests remain at that time, it is appropriate to issue the reject signal.

It will be appreciated that the predetermined criteria that can be applied by the request logic can take a variety of forms. However, in one embodiment, the predetermined criteria applied by the request logic comprises a determination as to whether each data processing unit is currently servicing an interrupt request whose priority level is the same or higher than the priority level of the highest priority of said unserviced interrupt requests, the candidate data processing units being determined to be any of said data processing units that are not currently servicing such an interrupt request. Hence, if a particular data processing unit is already handling an interrupt request which has a priority level the same or higher than the priority level of the highest priority unserviced interrupt request, then it will not be considered to be a candidate data processing unit, but unless that condition applies, it will be considered to be a candidate data processing unit, and accordingly will be sent a request signal by the request logic.

In one embodiment, the request logic comprises a plurality of request units, each request unit being associated with one of said data processing units and being operable to control issuance of the request signal to that data processing unit in dependence on the predetermined criteria.

More particularly, in one embodiment, each request unit comprises priority level masking logic operable to receive said indication of unserviced interrupt requests and a current priority level of an interrupt request currently being serviced by the associated data processing unit, and to prevent the request signal being issued to the associated data processing unit only if none of said unserviced interrupt requests has a priority level which is higher than the current priority level.

Typically, the interrupt requests are generated by a plurality of interrupt sources, and the priority levels associated with each interrupt request are dependent on the interrupt source from which that interrupt request is generated.

In one embodiment, the interrupt controller further comprises an interrupt source interface operable to receive the interrupt requests from the interrupt sources and to determine as the unserviced interrupt requests any received interrupt requests from interrupt sources which are not currently having an interrupt request serviced by one of said data processing units.

Accordingly, it will be appreciated that not all interrupt requests received by the interrupt source interface will be considered to be unserviced interrupt requests, but rather any interrupt requests emanating from interrupt sources which already have interrupt requests being serviced by one of the data processing units will be excluded from the list of unserviced interrupt requests considered by the request logic and the priority encoding logic.

In one embodiment, the interrupt controller further comprises current servicing interrupts logic coupled to the handshake logic and operable to record which interrupt sources have interrupt requests currently being serviced by one of said data processing units, the current servicing interrupts logic being operable to be updated each time the handshake logic allocates one of said unserviced interrupts to one of said candidate data processing units, and each time the servicing of an interrupt request is completed by one of said data processing units. This provides an efficient technique for keeping track of which interrupt sources have interrupt requests currently being serviced by one of the data processing units.

Given that the interrupt source interface would automatically exclude from the list of unserviced interrupt requests any received interrupt requests which are from interrupt sources which already have interrupt requests being processed by one of the data processing units, it will be appreciated that the determination of a highest priority unserviced interrupt request by the priority encoding logic will only make the determination with reference to unserviced interrupt requests. However, since there will be some latency between the handshake logic allocating to a candidate data processing unit an unserviced interrupt request, and the returning of that information to the interrupt source interface, then in one embodiment the priority encoding logic preferably further comprises masking logic operable to receive an indication of which interrupt sources have interrupt requests currently being serviced by one of said data processing units, and to mask from consideration in the determination of the highest priority unserviced interrupt request any unserviced interrupt requests from those interrupt sources. As soon as the handshake logic allocates to a candidate data processing unit an unserviced interrupt request, that information is fed to the masking logic within the priority encoding logic so that the priority encoding logic always maintains the most up-to-date indication of which interrupt sources have interrupt requests currently being serviced by one of the data processing units, and hence the priority encoding logic can determine which interrupt requests to take into account when determining a new highest priority unserviced interrupt request.

In one embodiment, the interrupt controller further comprises priority stack pop control logic having a storage identifying for each interrupt source which data processing unit, if any, is servicing an interrupt request from that interrupt source, the storage being updated each time the handshake logic allocates one of said unserviced interrupts to one of said candidate data processing units, and each time the servicing of an interrupt request is completed by one of said data processing units.

Additionally, in one embodiment, the handshake logic comprises a plurality of handshake units, each handshake unit being operable to receive an acknowledgement signal associated with a corresponding one of said data processing units, and each handshake unit having a priority stack identifying the priority level of the interrupt request currently being serviced by the corresponding data processing unit, each priority stack's pop operation being controlled by the priority stack pop control logic.

Accordingly, in one embodiment, the handshake unit will push onto the corresponding priority stack an indication of a current priority level when it is determined to allocate a particular interrupt request to the corresponding data processing unit. When, in due course, the processing of that interrupt request is completed, this information will be reflected in the priority stack pop control logic, and the priority stack pop control logic will then pop that priority level from the priority stack so that the priority stack now identifies as the current priority level the priority level that existed prior to the servicing of the now-completed interrupt request.

As mentioned earlier, the predetermined criteria applied by the request logic can take a variety of forms. However, in one embodiment, the request logic has access to a status field associated with each of said data processing units and operable to indicate whether the associated data processing unit is enabled for interrupts, the indication provided by each such status field being referenced when applying said predetermined criteria. Hence, if a particular data processing unit is not enabled to handle interrupts, then this can be taken into account when the request logic is determining which of the data processing units are candidate data processing units to which request signals should be issued.

In one embodiment, the request logic is asynchronous logic, thereby enabling the requests signals to be issued to each candidate data processing unit even if a system clock is turned off. Preferably, the receipt of a request signal by a candidate data processing unit will cause the system clock to be turned back on, thereby enabling the candidate data processing unit to resume operation, and in due course reply to the request signal.

It will be appreciated that the manner in which the handshake logic allocates an unserviced interrupt request to one of the candidate data processing units may take a variety of forms. However, in one embodiment, the handshake logic is operable to allocate an unserviced interrupt request to one of said candidate data processing units by issuing an address valid signal, and causing an address to be issued to the candidate data processing unit identifying a service routine to be executed by the data processing unit to service that interrupt request.

In one embodiment, the interrupt controller is further operable to process fast interrupt requests, such fast interrupt requests being of a different interrupt type to said interrupt requests and having no priority level associated therewith, the interrupt controller comprising: additional request logic operable to receive an indication of unserviced fast interrupt requests, and to issue a fast request signal to each of said data processing units; additional handshake logic operable to receive fast acknowledgement signals associated with said data processing units replying to said fast request signals issued by the additional request logic, upon receipt of a first fast acknowledgement signal, the additional handshake logic being operable to allocate to the data processing unit associated with that first fast acknowledgement signal the unserviced fast interrupt requests, and to prevent the additional request logic from issuing any further fast request signals.

Typically, a single interrupt service routine will be defined for handling fast interrupt requests, and accordingly it is important that only one data processing unit is trying to service a fast interrupt request at any point in time. Accordingly, this is why the handshake logic prevents the request logic from issuing any further fast request signals whilst the data processing unit allocated the unserviced fast interrupt requests is performing the necessary interrupt service routine.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1A:
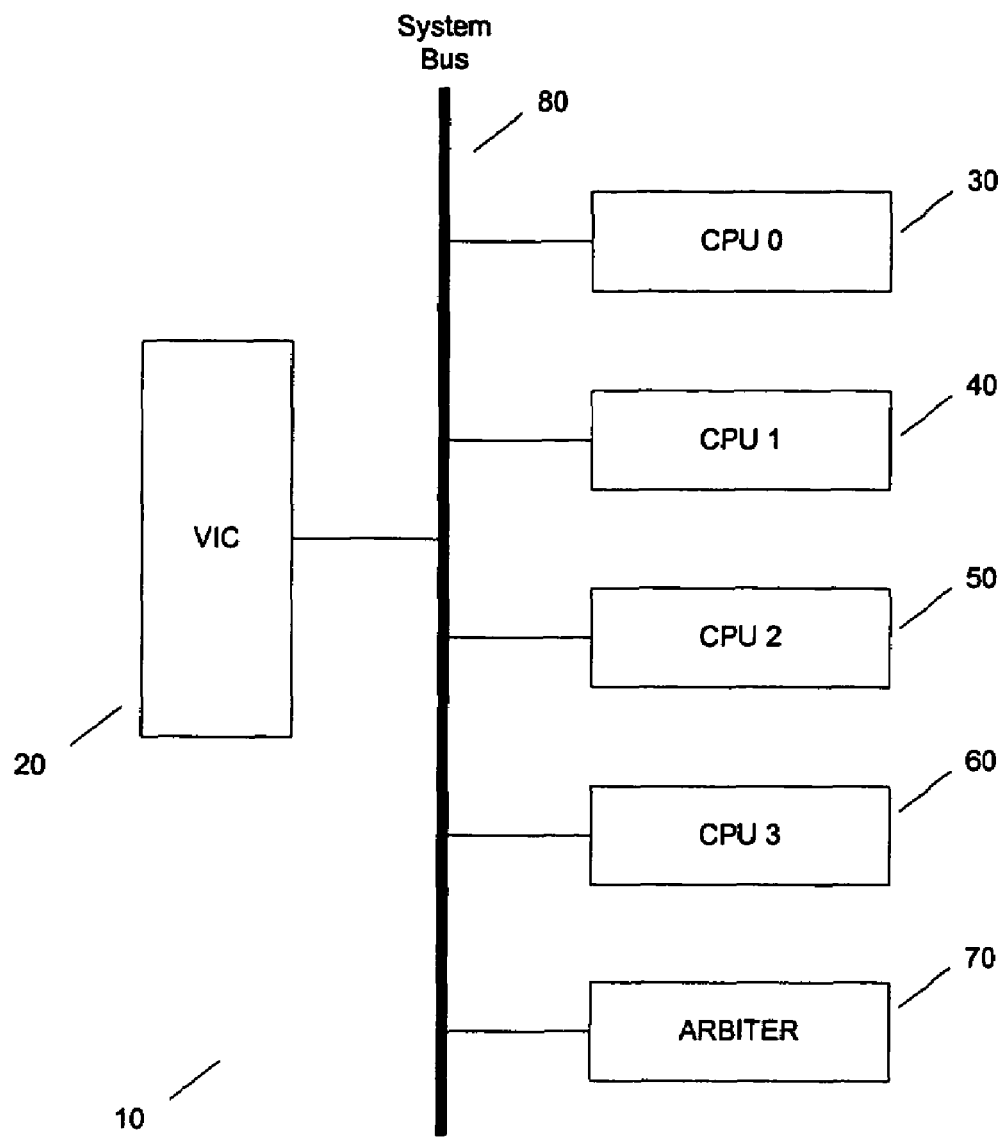
FIG. 1A is a block diagram illustrating a data processing system in accordance with one embodiment of the present invention.

FIG. 1A is a block diagram of a data processing system in accordance with one embodiment of the present invention. As shown in FIG. 1A, a Vectored Interrupt Controller (VIC) 20 is connected via a system bus 80 to four processors, in this example, four CPUs 30, 40, 50, 60. Whilst four CPUs are shown in FIG. 1A, it will be appreciated that other data processing units could be provided instead of, or in addition to CPUs, namely DMA controllers, etc.

An arbiter 70 is also provided to control access by the various logic units to the system bus 80. When any of the CPUs 30, 40, 50, 60 wish to access the system bus 80 in order to initiate a transfer of data, they will issue a bus access request to the arbiter 70, which will arbitrate between multiple requests by applying predetermined prioritisation criteria, such that at any point in time only one logic unit will be granted access to the system bus 80.

It will be appreciated by those skilled in the art that typically there will be other logic units also connected to the system bus, but for the sake of ease of illustration, these elements have been omitted from FIG. 1A.

Figure 1B:
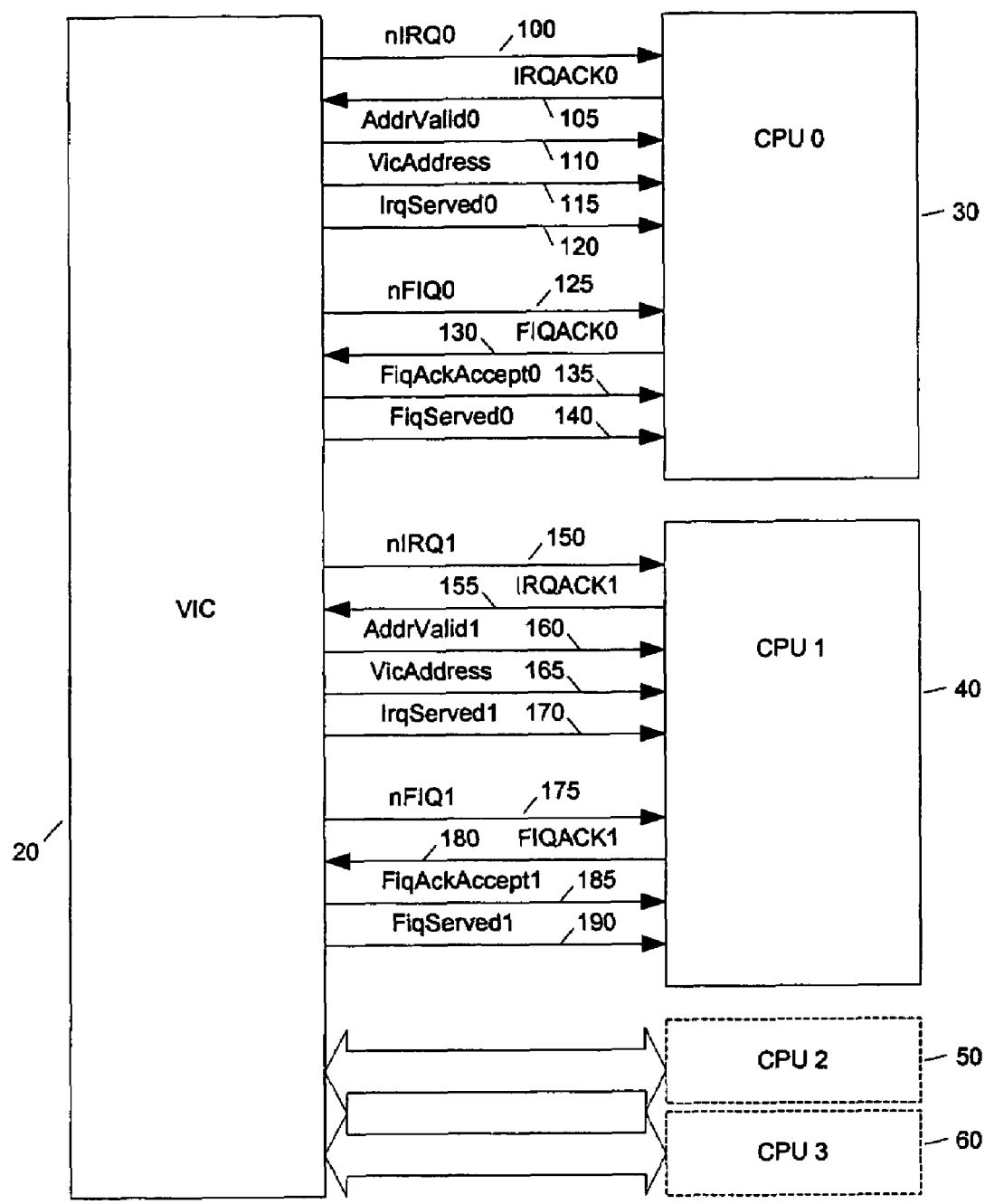
FIG. 1B is a diagram illustrating various signals passed between an interrupt controller and each processor in accordance with one embodiment of the present invention.

FIG. 1B is a diagram illustrating the various signals that may be passed between the VIC 20 and the various CPUs 30, 40, 50, 60 in order to handle the processing of interrupts in accordance with one embodiment of the present invention. As will be discussed in more detail later, when the VIC 20 determines that there is an unserviced interrupt request, it will issue request signals to each processor that it determines may be able to service that interrupt request, such processors being referred to as candidate processors. These request signals are labelled in FIG. 1B as nIRQ signals, and it can be seen that the request signal to CPU0 30 is passed over path 100, the request signal to CPU1 40 is passed over path 150, etc.

In one embodiment of the present invention, each CPU is arranged to issue an acknowledgement signal back to the VIC 20 when it is able to accept the interrupt request, these signals being referenced in FIG. 1B as IRQACK signals, as for example illustrated being returned over paths 105, 155 from CPUs 0 and 1. When the VIC 20 accepts an acknowledgement signal, it will then cause an address for an Interrupt Service Routine (ISR) to be returned to the accepted processor, along with a signal indicating that the address is valid. As shown in FIG. 1B, if the acknowledgement from CPU0 is accepted, these signals are passed over paths 110, 115, whilst if CPU1's acknowledgement is accepted, these signals are passed over paths 160, 165.

In accordance with embodiments of the present invention, since the interrupt controller 20 is arranged to issue request signals to each candidate processor, it is possible that more acknowledgement signals may be received by the interrupt controller 20 than there are unserviced interrupt routines that can be handled by the acknowledging processors. Accordingly, in accordance with one embodiment of the present invention, the interrupt controller 20 is able in such scenarios to issue a reject signal to a processor that has issued an acknowledgement signal, if at the time the acknowledgement signal is handled by the interrupt controller 20, it is determined that there are no unserviced interrupt routines that can be handled by that processor. In FIG. 1B, this reject signal is referred to as an IrqServed signal. Accordingly, a path 120 is provided for sending an IrqServed signal to CPU0, whilst a separate path 170 is provided for sending an IrqServed signal to CPU1.

As will be discussed in more detail later, additional paths are also provided for handling fast interrupts, again the interrupt controller 20 being arranged to issue request signals to each candidate processor that may handle such fast interrupts, these signal being referred to as nFIQ signals in FIG. 1B. Accordingly, such a request signal may be issued over path 125 to CPU0, or over path 175 to CPU1. In systems where only one processor was provided for handling such fast interrupts, there was no need for an acknowledgement signal to be issued by the processor receiving such an interrupt request. However, because the interrupt request is in accordance with embodiments of the present invention broadcast to each available candidate processor, then acknowledgement signals are in one embodiment arranged to be returned by each CPU, these signals being referred to as FIQACK signals in FIG. 1B (see for example paths 130, 180). If the interrupt controller accepts a particular acknowledgement signal, then it will issue an accept signal (see paths 135, 185 of FIG. 1B), whereas if an acknowledgement signal is rejected (because an earlier received acknowledgement signal has already been accepted by the interrupt controller 20), then a reject signal is issued (see paths 140, 190 of FIG. 1B).

Whilst the details of the connections with CPU2 and CPU3 are omitted from FIG. 1B, it will be appreciated that an identical set of signals may in one embodiment be provided for each of these additional processors.

To support these various signals, a port is provided on the interrupt controller from which connections can be made with the various CPUs. In preferred embodiments, the various signals illustrated in FIG. 1B pass over dedicated paths separate to the system bus 80.

However, as will become apparent from the subsequent discussion of embodiments of the present invention, it is not a requirement that each CPU is able to receive and issue the various signals illustrated in FIG. 1B, and in alternative embodiments the CPUs are arranged instead to be responsive to the various request signals from the interrupt controller to respond by seeking to obtain the required address for the interrupt service routine from the interrupt controller 20 via the system bus 80. The manner in which the interrupt controller 20 handles such replies to interrupt requests will be discussed in more detail later.

Figure 2:
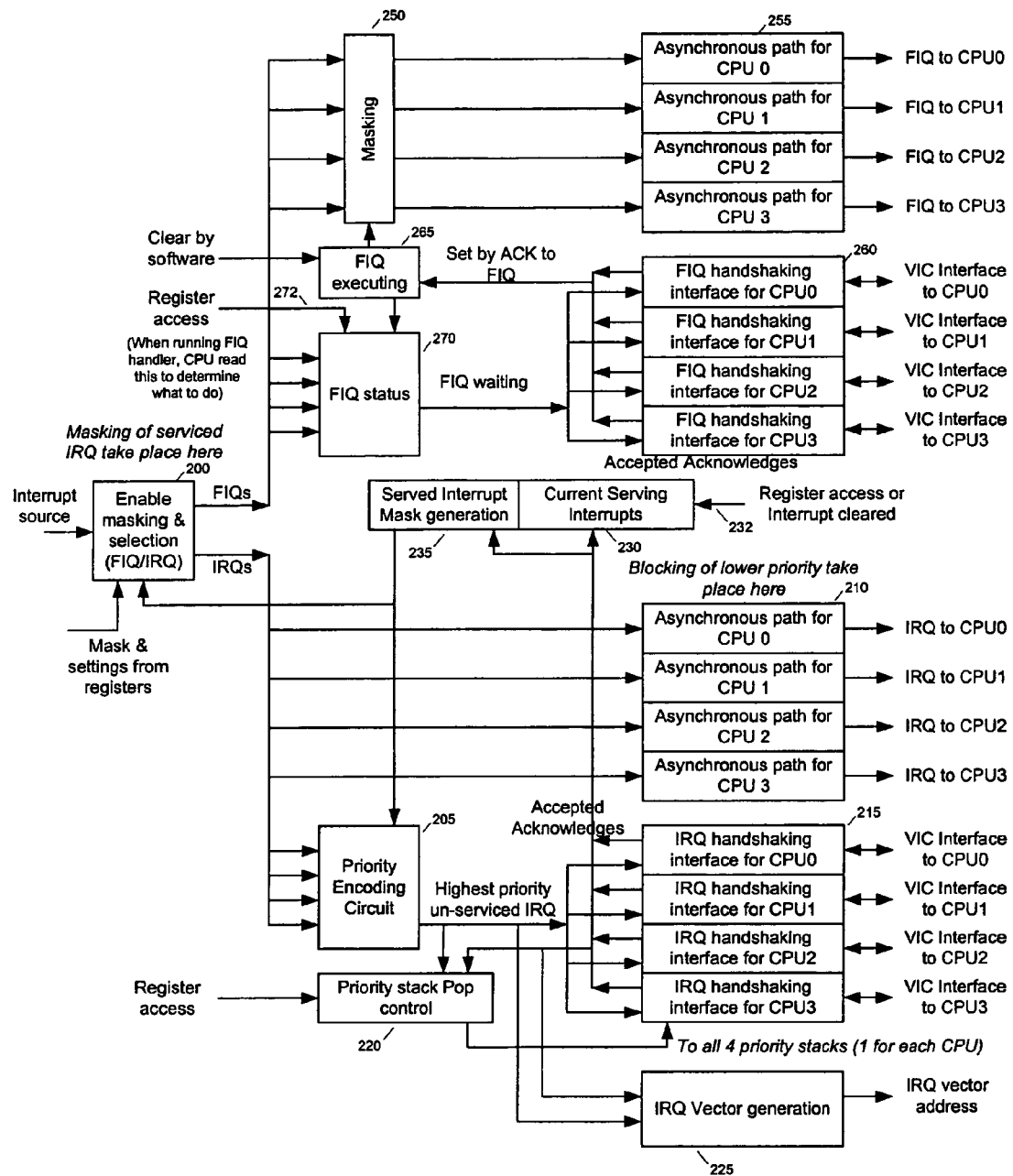
FIG. 2 is a block diagram illustrating in more detail components provided within an interrupt controller in accordance with one embodiment of the present invention.

FIG. 2 is a block diagram illustrating in more detail components provided within the interrupt controller 20 of FIGS. 1A and 1B. Each interrupt request received from an interrupt source is received by the enable, masking and selection logic 200 which performs various masking functions in order to determine which of those received interrupt requests should be considered as unserviced interrupt requests for forwarding to the rest of the logic shown in FIG. 2. The detail of the function of block 200 will be discussed later with reference to FIG. 3.

Considering first the normal interrupts, any unserviced normal interrupt requests are routed to the request logic 210, which in one embodiment has separate asynchronous paths for each processor. The function performed by the request logic is to apply predetermined criteria in order to determine for each processor whether that processor will be a candidate processor for servicing at least one of the unserviced interrupt requests, and if so to issue a request signal to each such candidate processor. Since the request logic 210 is asynchronous logic, this ensures that request signals can be issued to each candidate processor even if the system clock is turned off. Preferably, the receipt of a request signal by a candidate processor will cause the system clock to be turned back on, thereby enabling the candidate processor to resume operation, and in due course reply to the request signal. The details of the operation of the request logic 210 will be discussed later with reference to FIG. 3.

Any unserviced normal interrupt requests are also routed to priority encoding logic 205, the function of which is to determine the highest priority unserviced interrupt request, and to output signals identifying that highest priority unserviced interrupt request to the handshaking logic 215. More details of the operation of the priority encoding circuit 205 will be discussed later with reference to FIG. 3.

The handshaking logic 215 preferably includes separate handshake units for each processor, and the output from the priority encoding circuit 205 is passed to each such handshake unit. Each handshake unit is operable to receive an acknowledgement signal associated with the corresponding processor, which may be a direct acknowledgement signal issued by that processor (as illustrated in FIG. 1B), or alternatively may be an indirect acknowledgement signal produced internally within a register block of the interrupt controller, as will be discussed in more detail later.

As will be discussed later with reference to FIG. 4, the construction of the handshaking logic 215 is such that in any particular cycle, only one acknowledgement signal can be accepted by the handshake logic, and that accepted acknowledgement signal is output to current serving interrupts logic 230, and also to a priority stack pop control logic 220. The function of the current serving interrupts logic 230 is to keep track of which interrupt sources currently have interrupt requests being serviced by one of the processors, and accordingly this logic is responsive to receipt of an acknowledgement signal from the handshake logic 215 to update its records. Its records are also updated when it is subsequently advised via path 232 of completion of an interrupt service routine by any of the processors, this signal over path 232 being caused by either an access to a particular register on completion of an interrupt service routine, or the receipt of a signal clearing the interrupt.

The information stored within the current serving interrupts logic 230 is passed to served interrupt mask generation logic 235, which is arranged to output to both the enable, masking and selection logic 200 and the priority encoding circuit 205, a masking signal used to mask from consideration as unserviced interrupt requests those interrupt requests that are from interrupt sources that already have an interrupt request being handled by at least one of the processors. Preferably, in order to reduce any latency occurring as a result of the time taken to update the records within the current serving interrupts logic 230, the signal output by the handshake logic 215 indicating an accepted acknowledgement signal is also routed directly to the served interrupt mask generation logic 235 at the same time that it is forwarded to the current serving interrupts logic 230. The manner in which the mask information is used by the enable, masking and selection logic 200 and the priority encoding circuit 205 will be discussed later with reference to FIG. 3.

Figure 7:
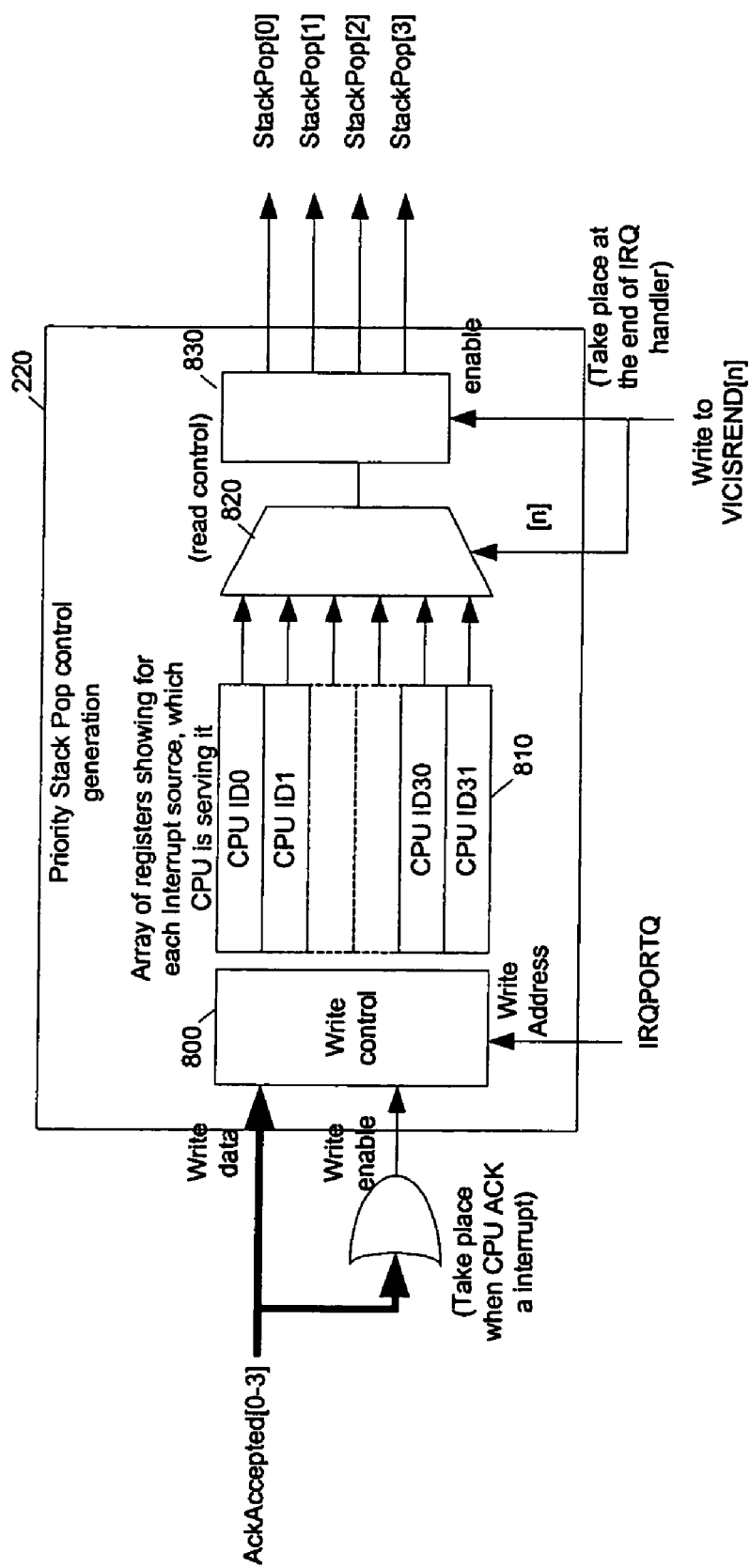
FIG. 7 is a block diagram illustrating in more detail the construction of the priority stack pop control logic of FIG. 2.

The priority stack pop control logic 220 is used to control the pop operation of stacks maintained within each handshake unit of the handshake logic 215 identifying the priority level of an interrupt request currently being serviced by the corresponding processor. Whenever an acknowledgement signal from a particular processor is accepted by the handshake logic, this information is forwarded to the priority stack pop control logic 220, which at the same time also has access to the highest priority unserviced interrupt request information as output by the priority encoding circuit 205, this enabling the priority stack pop control logic to identify, for each interrupt source, which processor is handling an interrupt request from that interrupt source. When a processor subsequently completes an interrupt service routine, it will access a register within the interrupt controller, and this register access will be notified to the priority stack pop control logic 220, which will cause it to output a signal to the relevant handshake unit within the handshake logic 215 to cause the level stored in its stack to be popped from the stack, thereby updating the information in the stack. This process will be discussed in more detail with reference to FIGS. 4 and 7.

When a particular acknowledgement signal is accepted by the handshake logic 215, this information is also forwarded to a vector generation logic 225, which also at that time receives the details of the highest priority unserviced interrupt request as determined by the priority encoding circuit 205. With this information, the vector generation logic 225 then outputs a vector address for the appropriate interrupt service routine to be used to service that interrupt request. Details of the function performed by the vector generation logic 225 will be discussed in more detail later with reference to FIGS. 3 and 6.

Considering now the processing of fast interrupts, any unserviced fast interrupt requests are output from logic 200 to an FIQ status logic 270 and to masking logic 250. Assuming no processor is currently servicing a fast interrupt request, then the logic 250 performs no masking function, and instead the interrupt request is forwarded to the fast request logic 255, which will forward a request signal on to each processor that is enabled to handle fast interrupts. The handshake logic 260 will then await receipt of acknowledgement signals associated with each processor that received a request signal.

When the handshake logic 260 receives the first acknowledgement signal, then provided the FIQ status logic 270 indicates that there is a fast interrupt request waiting, it will output a signal to the FIQ executing logic 265 to set the FIQ executing logic. This will cause the FIQ executing logic 265 to activate the masking logic 250 to prevent any further unserviced interrupt request from being forwarded to the fast request logic 255. Further, the FIQ executing logic 265 will send a signal to the FIQ status logic 270 to cause the FIQ status logic to stop indicating to the handshake logic 260 that there are any unserviced fast interrupt requests, thus causing any subsequent acknowledgement signals to be rejected.

During running of the fast interrupt handler by the relevant processor, the processor will access the FIQ status logic 270 via the register access path 272 in order to determine what functions need performing.

Once that processor has completed execution of any outstanding fast interrupt requests, it will cause the FIQ executing logic 265 to be cleared, thereby causing the FIQ executing logic to deactivate the masking function of the masking logic 250, and allow the FIQ status logic 270 to resume indicating to the handshake logic 260 when there are any subsequent unserviced fast interrupt requests output by the logic 200.

Figure 3:
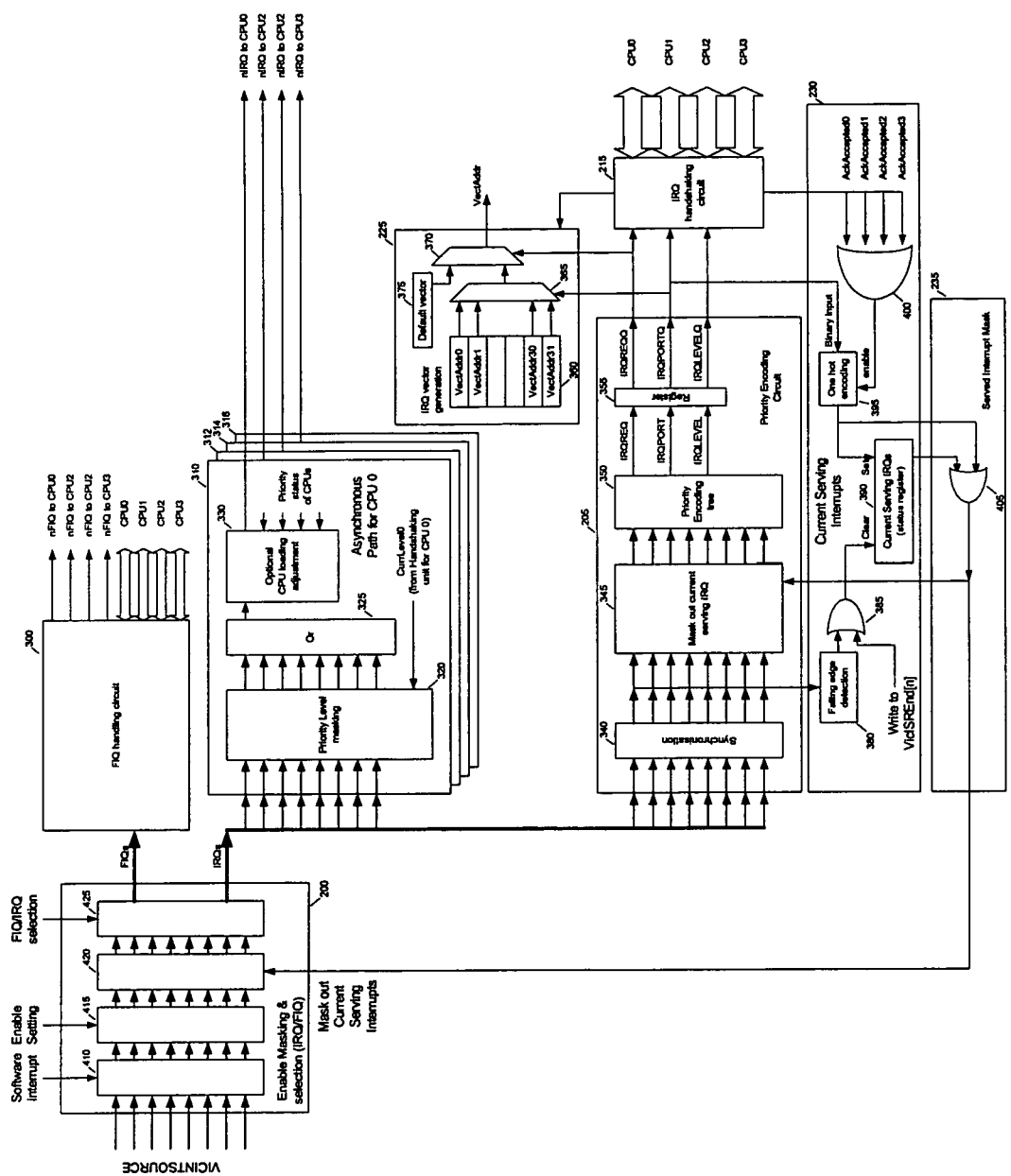
FIG. 3 is a block diagram illustrating in more detail the processing of normal interrupts within an interrupt controller of one embodiment of the present invention.

FIG. 3 illustrates in more detail the processing performed by the logic of FIG. 2 in order to handle normal interrupt requests (referred to herein as IRQs). In FIG. 3, all of the previous logic described in FIG. 2 for handling fast interrupts is shown schematically by the block 300.

As shown in FIG. 3, the enable, masking and selection logic 200 includes four blocks 410, 415, 420 and 425. Block 410 is controlled by a software interrupt signal, and enables one or more of the actual interrupt requests received from the various interrupt sources to be combined with a software interrupt, as is known by those skilled in the art. The output from block 410 is then passed to block 415, which receives enable setting signals indicating whether particular interrupt sources are enabled. It is in this block that any interrupt request received from interrupt sources that are not enabled is masked from the rest of the logic within the interrupt controller. The output from block 415 is then passed to block 420, which is arranged to receive a signal from the served interrupt mask logic 235 used to mask from consideration any interrupt requests received from interrupt sources that already have an interrupt request being serviced by one of the processors.

The output from block 420 is then received by block 425 which is responsive to a signal indicating whether the interrupt requests are fast interrupt requests or normal interrupt requests, to determine whether the unserviced interrupt requests should be routed as fast interrupt requests to the FIQ handling circuit 300, or as normal interrupt requests to the remainder of the logic illustrated in FIG. 3.

As shown in FIG. 3, the request logic consists of a plurality of request units 310, 312, 314, 316, one request unit being provided for each processor that can be used to handle interrupt requests. Each request unit will consist of the same logic. In FIG. 3, the details of this logic is illustrated with reference to the request logic 310. Firstly, the various unserviced interrupt requests as output by logic 200 are received by a priority level masking logic 320 which is also arranged to receive from the handshaking unit of the handshaking circuit 215 associated with the same processor an indication of the priority level of the interrupt request currently being handled by that processor, if any. The priority level masking logic is arranged to mask from consideration by the rest of the request unit 310 any received interrupt requests whose priority is lower or the same as that already being handled by the corresponding processor. Hence, any incoming interrupt requests received by the priority level masking circuit 320 will be forwarded on to the OR gate 325 if they have a priority level which is higher than the priority level of an interrupt request currently being handled by the corresponding processor.

The OR gate 325 combines the various received signals in order to generate a signal to optional CPU loading adjustment logic 330, which can be used to apply any further predetermined criteria which it is decided should be applied before determining whether the corresponding processor is a candidate processor for handling a currently unserviced interrupt request. As an example of how the optional CPU loading adjustment logic 330 can be used, this logic may have access to a status field associated with the corresponding processor and operable to indicate whether the associated processor is enabled for interrupts. This would hence prevent a particular processor being considered as a candidate for an interrupt request if it is temporarily unable to process interrupt requests. As an alternative, the optional CPU loading adjustment logic 330 can receive priority status information relating to the various CPUs such that if it can be determined that other of the processors are better candidates for handling an unserviced interrupt request, this fact can be used to suppress issuing a request signal to the processor. As an example, if, when an interrupt with a high priority takes place, CPU0 is already running an interrupt service routine for a medium priority interrupt and CPUs 1, 2 and 3 are not running any interrupt service routine, it is beneficial to suppress the interrupt request to CPU0 so that two interrupt service routines can be executed at the same time by two different CPUs.

Hence, the result of the processing within the various request units 310, 312, 314 and 316 is that request signals are issued to each processor that is considered to be a candidate for handling at least one of the unserviced interrupt requests output from the logic 200.

At the same time, these unserviced interrupt requests are forwarded to the priority encoding circuit 205, which includes some synchronisation logic 340 for synchronising the input signals with a system clock signal, after which the interrupt request signals are forwarded to a masking logic 345. As can be seen from FIG. 3, the masking logic 345 receives a signal from the served interrupt mask logic 235 used to mask from further consideration any interrupt requests that are from interrupt sources that already have an interrupt request being handled by one of the processors. Accordingly, the function of the mask logic 345 is analogous to the function performed by the block 420 within the enable, masking and selection logic 200. However, the use of the logic 345 within the priority encoding circuit 205 means that the priority circuit 205 is always working with the most up-to-date information, and hence can immediately mask from consideration any interrupt requests that the logic 200 has decided is an unserviced interrupt request, but by the time it is being considered by the priority encoding circuit 205 is no longer an unserviced interrupt request, due to the fact that an earlier issued interrupt request from that particular interrupt source has now been accepted for servicing by one of the processors.

The output signals from the masking logic 345 are passed to a priority encoding tree 350, which applies predetermined criteria to determine which is the highest priority interrupt request selected from those output from the mask logic 345. As will be appreciated by those skilled in the art, interrupt requests are typically allocated priorities dependant on which interrupt source has issued those interrupt requests, and accordingly it is a simple matter for the priority encoding tree 350 to determine which of the unserviced interrupt requests forwarded by the mask logic 345 has the highest priority. This results in the priority encoding tree outputting an IRQREQ signal which is set whenever there is an unserviced interrupt request being identified by the priority encoding tree, an IRQPORT signal identifying the source of the interrupt request, and an IRQLEVEL signal indicating the priority level of the interrupt request. These three signals are then registered within the register 355, prior to being propagated onto the handshaking circuit 215. These propagated versions of the signals are referred to in FIG. 3 as IRQREQQ, IRQPORTQ and IRQLEVELQ.

The IRQPORTQ signal is forwarded to a multiplexer 365 within the vector generation logic 225, whilst the IRQREQQ signal is forwarded to the mulitplexer 370 within the vector generation logic 225. The storage 360 is used to store for each possible interrupt source a vector address identifying an interrupt service routine to be executed by the processor to service that interrupt request, these various addresses being supplied to the multiplexer 365. Accordingly, based on the IRQPORTQ signal received by the multiplexer 365, the appropriate vector address can be output to the multiplexer 370. The multiplexer 370 us then arranged to output that vector address provided that the IRQREQQ signal is set to indicate that a valid highest priority unserviced interrupt request is being output by the priority encoding circuit 205. If the IRQREQQ signal is not set, then the multiplexer 370 is instead arranged to select a default vector address 375 for outputting as the vector address. For a processor that uses the direct signals illustrated in FIG. 1B, the default vector is not used, as the processor will receive a reject signal and take no further action. However, for any processors which respond to request signals via the system bus, the default vector address can be used to cause the processor to execute a default handler, which is for example a simple interrupt return instruction.

The vector generation logic 225 is also arranged to receive a control signal from the handshaking circuit 215 to ensure that a vector address is generated each time an acknowledgement signal from a processor is accepted by the handshaking circuit. Further details of the generation of vector addresses will be provided later with reference to FIG. 5.

Whenever the handshaking units within the handshaking circuit 215 accept an acknowledgement signal associated with a processor, that acceptance is propagated to the OR gate 400 within the current serving interrupts logic 230 to cause an enable signal to be issued to the 1 hot encoding logic 395. The 1 hot encoding logic 395 is arranged to receive as a binary input the IRQPORTQ signal output from the priority encoding logic 205, and on receipt of an enable signal propagates that signal to the set pin of the current serving interrupts status register 390. This causes that status register to be updated to indicate that any further interrupt requests from that interrupt source should not be considered as unserviced interrupt requests, since an interrupt request from that interrupt source is now being serviced by one of the processors. Each clock cycle, the contents of the status register 390 are forwarded to the OR gate 405 within the serviced interrupt mask logic 235, which also directly receives the output from the 1 hot encoding logic 395, this ensuring that the masking information output by the OR gate 405 is always as up-to-date as it can be.

Within the interrupt controller, a register is provided referred to in FIG. 3 as the VicISREnd[n] register, which is written to by a processor to indicate the end of an interrupt service routine. The contents of this register are routed via an OR gate 385 to the clear pin of the status register 390, so as to clear from the masking information any interrupt source whose interrupt request has finished being handled by one of the processors. The OR gate 385 also receives the output from a falling edge detection logic 380, which monitors the signals output by the synchronisation logic 340. Accordingly, when the signal on any of the interrupt request lines between the synchronisation logic 340 and the mask logic 345 transitions from a set state to a reset state, indicating that the corresponding interrupt source no longer has an unserviced interrupt request, this will be detected by the edge detection logic 380 to cause a signal to be propagated via the OR gate 385 to the status register 390 to clear the corresponding bit from the status register.

Figure 5:
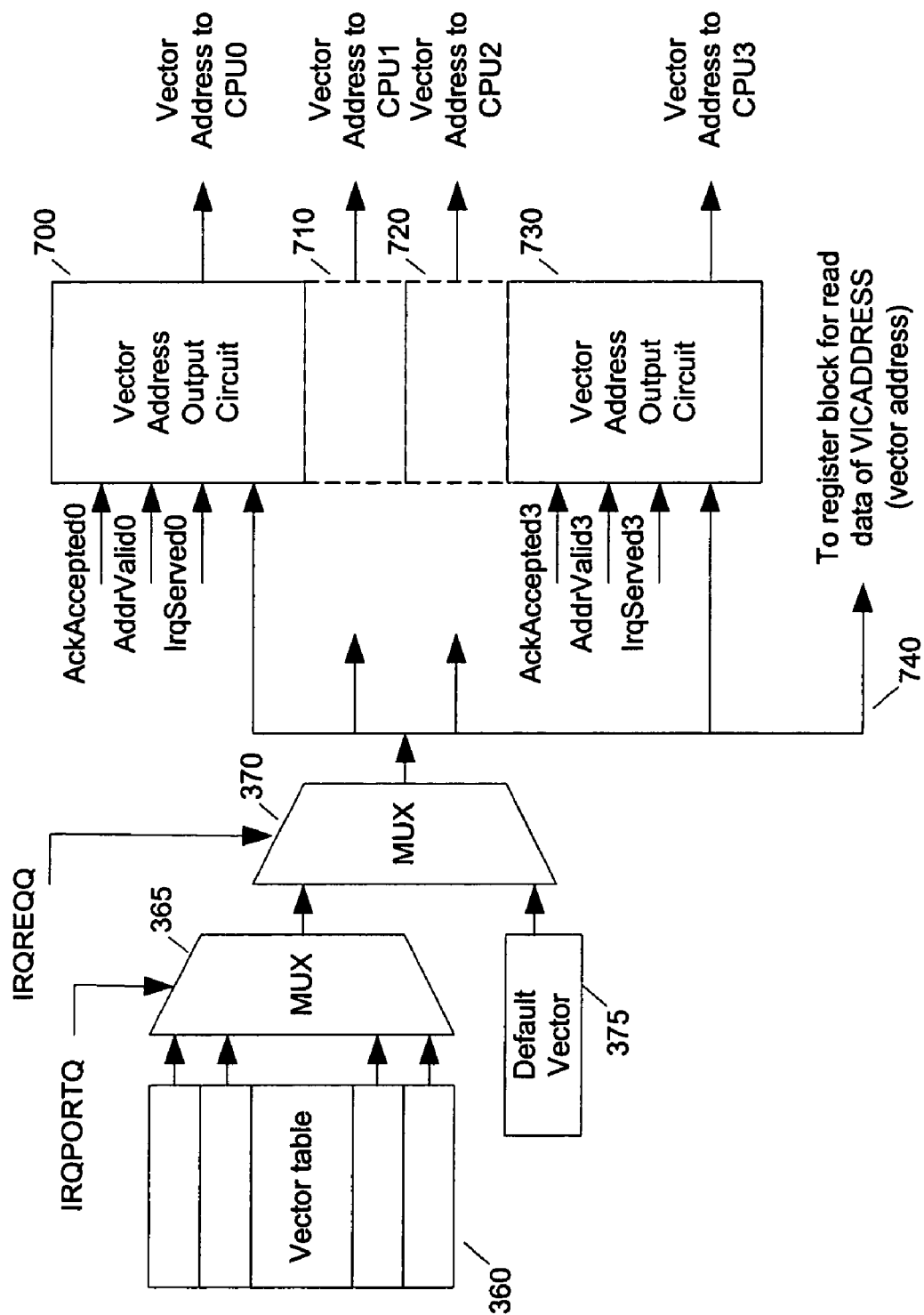
FIG. 5 is a block diagram illustrating the generation of a vector address for an interrupt service routine in accordance with one embodiment of the present invention.

FIG. 5 is a block diagram illustrating in more detail the generation of vector addresses in accordance with an embodiment of the present invention. The functions of the storage 360 and 375, and the associated multiplexers 365 and 370 have already been described earlier with reference to FIG. 3. The output from the multiplexer 370 is forwarded to vector address output circuits 700, 710, 720 and 730, one circuit being associated with each processor. In addition, the output from the multiplexer 370 is forwarded over path 740 to a register block, whose function will be described in more detail later with reference to FIG. 6. Each vector output circuit 700, 710, 720 and 730 contains a register that fetches the vector address from the multiplexer 370 whenever a corresponding acknowledgement accepted signal is issued by the corresponding handshake unit within the handshake logic 215. This register then holds that vector address stable when either the address valid signal or the IrqServed signal is asserted to the corresponding processor, in order to allow that vector address to be output to the corresponding processor. Hence, with reference to the earlier-described FIG. 1B, this enables the VIC address to be asserted to the relevant processor whilst either the corresponding address valid or IrqServed signal is also issued to that processor.

For processors which respond to the request signals by seeking access to the VIC address via the system bus, rather than directly issuing an IRQACK signal to the interrupt controller, a different mechanism is used to provide the VIC address to the processor in the event that the interrupt controller decides to allocate an unserviced interrupt request to that processor, this mechanism being described below with reference to FIG. 6.

Figure 6:
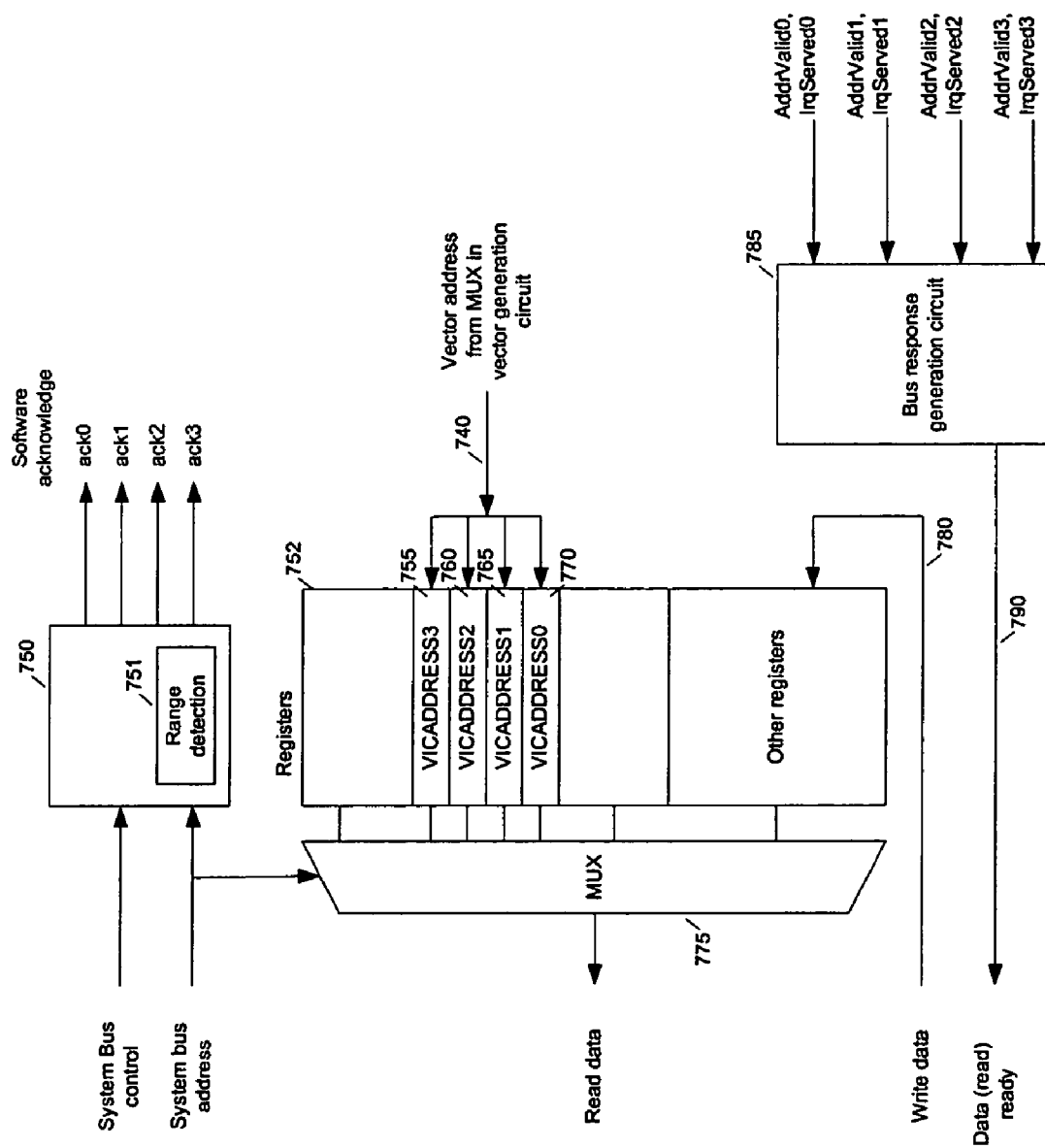
FIG. 6 is a block diagram of a register block and associated circuitry used in one embodiment of the present invention to enable generation of indirect acknowledgement signals to the handshaking circuit of FIG. 3, and the subsequent output of a vector address to a processor associated with such an indirect acknowledgement signal.

FIG. 6 illustrates the logic provided within a register block of the interrupt controller used to interface the interrupt controller to the system bus 80 illustrated in FIG. 1A. This register block includes indirect acknowledgement signal generator logic 750 arranged to monitor control and address signals received from the processors via the system bus in order to determine when a processor is replying to a request signal issued by the interrupt controller. More particularly, when such a processor replies to an interrupt request it will seek to access a particular register within the bank of registers 752 of the interrupt controller, this particular register being used to store the VIC address identifying the interrupt service routine to be executed by that processor. As can be seen from FIG. 6, the bank of register 752 includes four separate registers 770, 765, 760, 755, each register being associated with a particular one of the four processors. Each time the vector address generation logic described earlier with reference to FIG. 5 outputs a VIC address over path 740, this is stored in each of the four registers 770, 765, 760, 755. Hence, each of these registers has the same function, but different processors must use a unique address to access a particular one of these registers, this address being provided to the multiplexer 775 to cause the appropriate register's contents to be output as read data to the processor.

Since a unique address is used, range detection logic 751 within the logic 750 can be used to determine which processor is replying to the request signal issued by the interrupt controller, thereby enabling the logic 750 to generate an indirect acknowledgement signal, referred to in FIG. 6 as a software acknowledge signal, for routing to the handshaking circuit 215. Hence, even though the processor may not be arranged to issue direct acknowledgement signals to the VIC port of the interrupt controller, this mechanism allows such an acknowledgement signal to be simulated by the logic 750 for routing to the handshake logic 215, so that the handshake logic 215 can operate in exactly the same manner irrespective of whether the processor replies to the interrupt request by issuing a direct acknowledgement signal, or replies to the interrupt request by seeking to access the VIC address directly from the register block of FIG. 6.

As described earlier, and as will be discussed in more detail later with reference to FIG. 4, the handshake logic 215 will allocate the highest unserviced interrupt request to the processor whose associated acknowledgement signal it receives first, this resulting in the generation of an appropriate address valid signal identifying the processor being allocated the interrupt request. These address valid signals, or alternatively the relevant IrqServed signals issued in the event that any acknowledgements need to be rejected, will be routed to the relevant output pins of the VIC ports for routing directly to any processors using the direct signals illustrated in FIG. 1B, but will also be forwarded to the bus response generation circuit 785 of the register block for use in the event that any of those processors are not employing the direct signals illustrated in FIG. 1B.

These signals will be used by the bus response generation circuit 785 to generate a data read ready signal over path 790 to be issued in correspondence with any VIC address output from the multiplexer 775 from the appropriate VIC address register 755, 760, 765, 770. Accordingly, by this approach, if the processor responds to a request signal by seeking to access the VIC address directly from the register block, then it will only be arranged to read the data output by the multiplexer in the event that a data read ready signal is asserted at the same time. This data read ready signal will be asserted if the corresponding processor is allocated an interrupt request by the handshake logic 215, or if the corresponding processor's acknowledgement signal is rejected, as will be indicated by the corresponding address valid signal or Irqserved signal input to the bus response generation circuit 785. In the latter case, the vector address accessed will identify a default handler, which will cause the processor to execute a simple interrupt return instruction.

Figure 4:
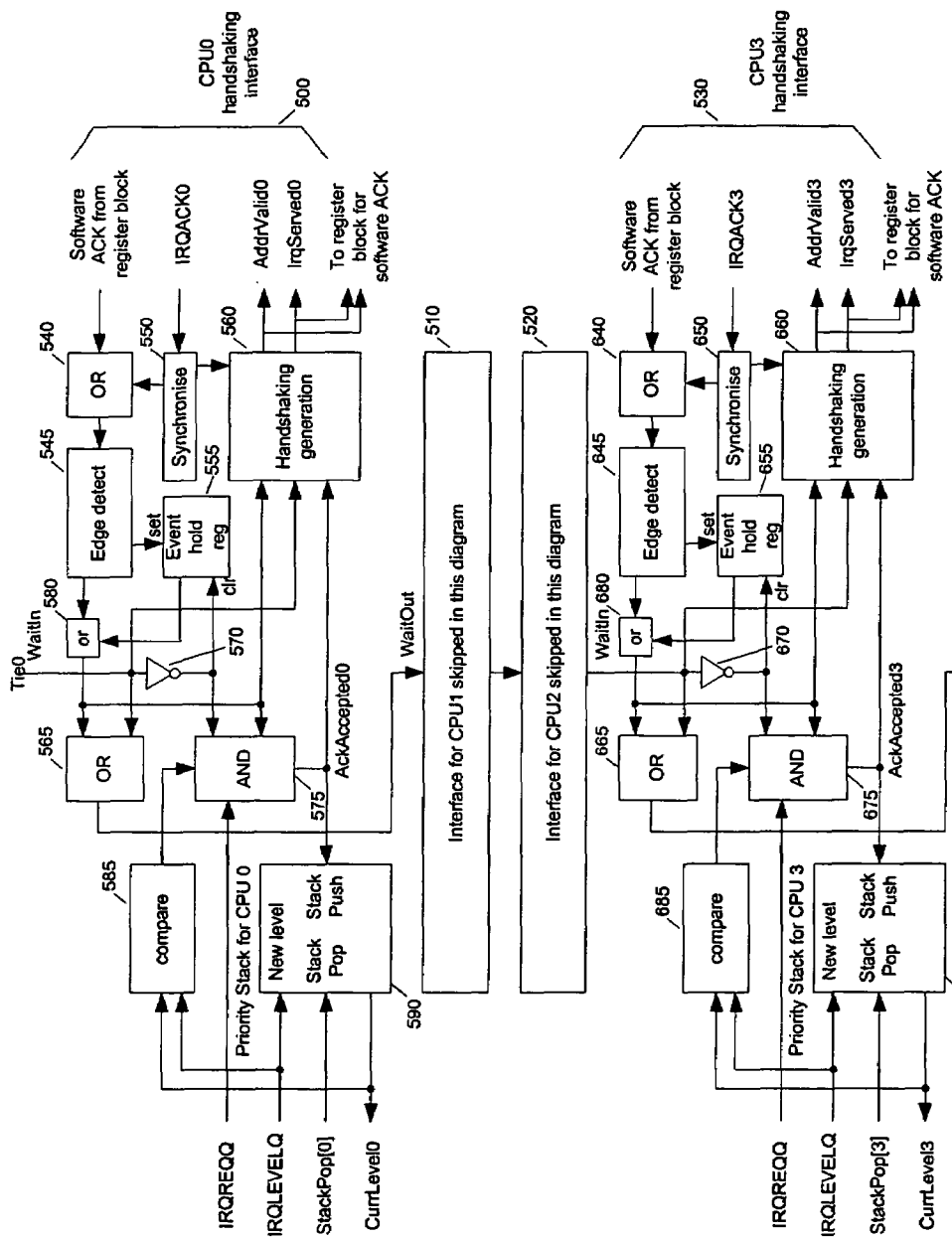
FIG. 4 is a block diagram illustrating in more detail the construction of the handshaking circuit of FIG. 3 in accordance with one embodiment of the present invention.

FIG. 4 is a block diagram illustrating in more detail the construction of each handshake unit within the handshake logic 215. As mentioned earlier, the handshake logic 215 comprises a plurality of handshake units 500, 510, 520, 530, one handshake unit being provided for each processor that may respond to interrupt requests.

Each of the handshake units is identical, but the units are daisy chained together in the way illustrated in FIG. 4. Considering the logic within the handshake unit 500, it can be seen that the acknowledgement signal from CPU0, assuming CPU0 issues a direct acknowledgement, will be received by the synchronise logic 550, where it will be synchronised with the system clock signal. If the CPU0 replies to request signals issued by the interrupt controller by seeking to access the VIC address from the register block, as described earlier with reference to FIG. 6, then the indirect acknowledgement signal generated by logic 750 will be received directly by the OR gate 540. The OR gate 540 outputs to the edge detect logic 545 either the synchronised acknowledgement signal output from the synchronised logic 550, or the acknowledgement signal received directly by the OR gate 540. The edge detection circuit 545 is used to convert the received signal into a single cycle pulse, which is then output to the OR gate 565 via OR gate 580 for feeding on to other handshake units further down the daisy chain. Further, this pulse event is stored within event holding register 555 in case a higher priority handshaking unit generates an acknowledge at the same time thereby suppressing the acknowledgement signal output by the edge detect logic 545, so that this pulse event can be re-issued in the next clock cycle to the OR gate 565. The holding register is cleared when any higher priority handshaking units do not assert a wait signal (i.e. they have no associated acknowledgement signal at that time).

Inverter 570 is arranged to receive a "WaitIn" signal which for the handshake unit 500 will be set low, but for any other handshake unit further down the daisy chain will correspond to the signal output by the OR gate 565 in the handshake unit above that handshake unit in the daisy chain. The inverter 570 inverts the WaitIn signal to produce a signal input to AND gate 575. Another input to the AND gate 575 receives the output from OR gate 580, which is arranged to receive both the output from the edge detect logic 545 and the output from the event hold register 555. Hence it can be seen that if the edge detect logic for a particular handshake unit outputs a set pulse, corresponding to receipt of an acknowledgement signal associated with the corresponding processor, and the WaitIn signal received from the handshake unit further up the daisy chain is low, this will signify to the AND gate 575 a condition in which the acknowledgement can be accepted.

However, an acknowledgement will only be accepted if the IRQREQQ signal also input to the AND gate indicates that there is currently an unserviced interrupt request to be handled, and if in addition the compare logic 585 determines that the IRQLEVELQ signal identifies a priority level higher than the current level stored within the priority stack 590. Assuming this is the case, then an AckAccepted signal output from the AND gate 575 will be set, which will cause the priority stack 590 to push onto the stack as the new priority level the level represented by the IRQLEVELQ signal. The AckAccepted signal will also be routed to the handshaking generation logic 560 to cause the handshaking generation logic to generate an address valid signal if the AckAccepted signal is set.

If the AckAccepted signal is low, then this will be received by the handshake generation logic 560 and action will be taken dependant on the value of the WaitIn signal also received by the handshaking generation logic and the signal output from the event hold register and received via the OR gate 580. If the output of the event hold register was high, indicating that an acknowledgement signal had been received associated with a corresponding processor, and the WaitIn signal was low, but despite this the AckAccepted signal was low, then this indicates to the handshake generation logic 560 that there must be no unserviced interrupt requests that can be handled by that particular processor, and accordingly it is appropriate to generate the IrqServed signal (i.e. the reject signal). However, for any other combination of the output of the event hold register and the value of the WaitIn signal, then no action is required by the Handshaking generation logic if the AckAccepted signal is low.

As will be appreciated from FIG. 4, since the output from OR gate 565 forms the WaitOut signal which becomes the WaitIn signal for the next handshake unit in the daisy chain, then if an acknowledgement associated with CPU0 is received at the same time that an acknowledgement is received from another CPU, then the presence of the acknowledgement from CPU0 will result in a set output from OR gate 565, which will suppress during that cycle consideration of any other acknowledgement signals by the handshake units further down the daisy chain. However, if in that cycle, the ACK from CPU0 was accepted by the handshake unit 500, then in the next cycle the handshake units 510, 520, 530 further down the daisy chain will be free to consider any acknowledgement signals that they receive, with an acknowledgement signal received by handshake unit 510 being given priority over an acknowledgement signal received by handshake unit 520, which in turn is given priority over an acknowledgement signal received by handshake unit 530.

From FIG. 4, it will be seen that each priority stack 590, 690 also receives a StackPop signal which when set is used to remove a current priority level from that priority stack. The manner in which this StackPop signal is generated will be discussed in more detail with reference to FIG. 7, which indicates the components provided within the priority Stack Pop control logic 220 mentioned earlier with reference to FIG. 2. The priority Stack Pop control logic 220 is arranged to maintain an array of registers 810 showing for each interrupt source which processor is servicing interrupt requests issued by it. Whenever the handshake logic 215 accepts an acknowledgement signal from a particular CPU, that information is forwarded to the write control logic 800 within the priority Stack Pop control logic 220, along with an indication (IRQPORTQ signal) of the source of the highest priority unserviced interrupt request at that time, as output by the priority encoding circuit 205. This causes the write control block to store within the appropriate register of the array 810 the identity of the CPU that has been allocated the interrupt request from that identified interrupt source.

The contents of this array of registers is output to a multiplexer 820, which is arranged to select one of those inputs to be output to the logic 830 dependant on the content of the VICISREND[n] register. As discussed earlier, this register is written to by a processor when it finishes execution of an interrupt service routine, and hence the contents of this register identify when each interrupt request has finished being serviced. Accordingly, as an example, if CPU0 had been executing an interrupt request from interrupt source 7, then the array of registers 810 would contain an identifier for CPU0 in the register associated with interrupt source 7. When CPU0 writes to the VICISREND[7] to confirm that the interrupt service routine has been completed, this will cause the multiplexer 820 to output to logic 830 the identifier for CPU0. This will then cause the logic 830 to generate a StackPop [0] signal to be issued to the priority stack 590 within the handshake unit 500 associated with CPU0. Receipt of this StackPop [0] signal by the priority stack 590 will cause the level at the top of the stack (i.e. the priority level associated with the interrupt request from interrupt source 7) to be popped from the stack, such that the new level at the top of the stack is then the previous priority level that existed prior to the interrupt request from interrupt source 7 being allocated to the CPU0.

Figure 8:
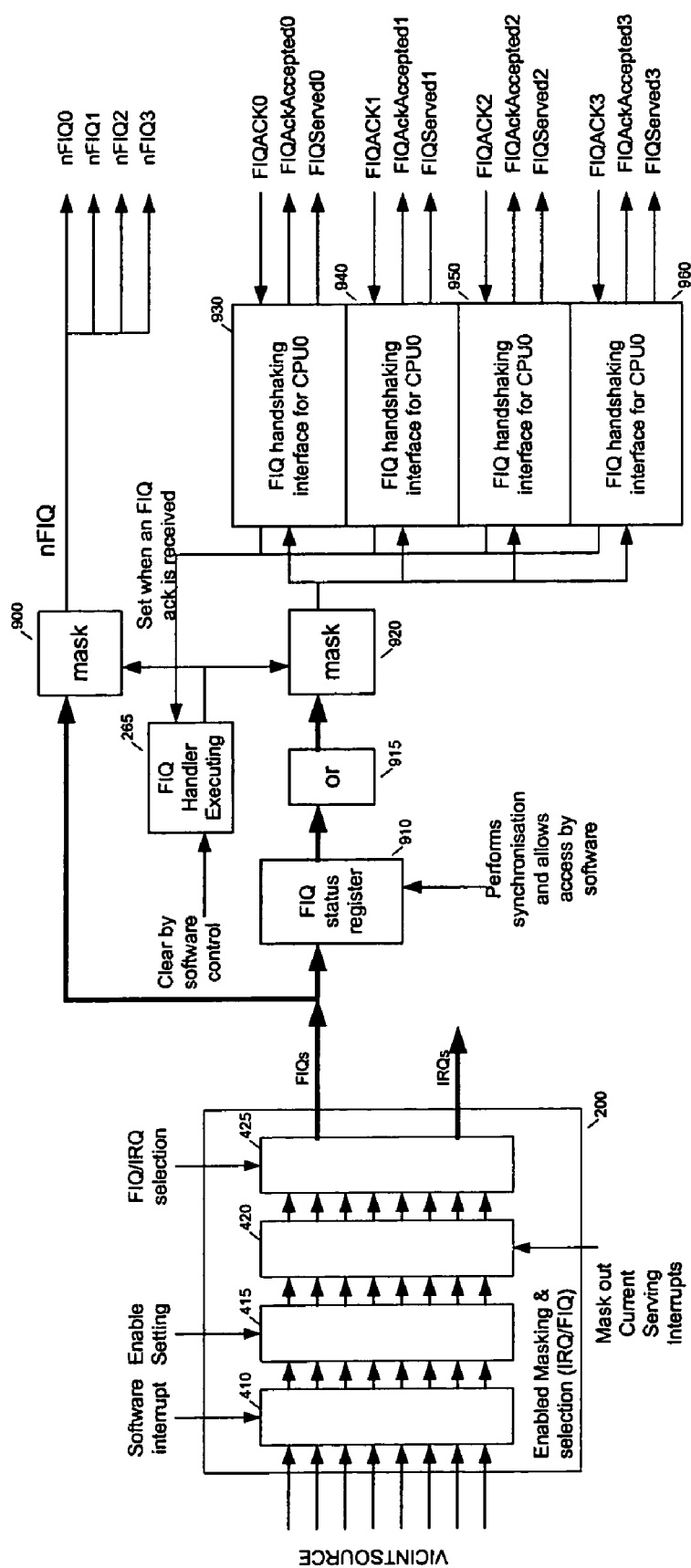
FIG. 8 is a block diagram illustrating the logic provided within the interrupt controller to handle fast interrupts in accordance with one embodiment of the present invention.

FIG. 8 shows in more detail the construction of the logic provided within the interrupt controller to handle fast interrupts. The function of the logic 200, and its component blocks 410, 415, 420 and 425 has been discussed earlier with reference to FIG. 3, and accordingly will not be discussed further at this stage. As each unserviced fast interrupt request is output from the logic 200, it is logged within the FIQ status register 910, and is also routed to the mask logic 900. The mask logic 900 is analogous to the mask logic 250 described earlier with reference to FIG. 2, and as discussed earlier will only mask forwarding of request signals to the available processors if the FIQ handler executing logic 265 has been set to indicate that a processor has already been allocated a fast interrupt request which has not yet been completed. Optionally mask logic 900 may also be arranged to receive signals such as enable signals indicating which processors are able to handle fast interrupt requests.

In the absence of any such masking, a fast request signal is issued to each processor that can handle fast interrupt requests, and the various handshaking units 930, 940, 950, 960, then await receipt of acknowledgement signals associated with the corresponding processors. As discussed earlier with reference to the normal interrupt request handling, these acknowledgement signals may be issued directly from the processors over the paths discussed earlier with reference to FIG. 1B, or alternatively may be indirect acknowledgement signals produced using a mechanism analogous to that described earlier with reference to FIG. 6 for normal interrupt requests.

When the first acknowledgement is received it will be accepted by the associated handshaking unit, and cause an acknowledgement accepted signal to be propagated to the FIQ handler executing logic 260 in order to set that logic so as to invoke the masking function of mask logic 900, and of mask logic 920 forming part of the FIQ status logic 270 discussed earlier with reference to FIG. 2.

As shown in FIG. 8, the FIQ status logic 270 consists of a FIQ status register 910, OR gate logic 915 and the mask logic 920. When the first acknowledgement signal is received by one of the handshake units 930, 940, 950, 960, then provided the signal output by the mask logic 920 to the handshake logic indicates that there is a fast interrupt request waiting, the acknowledgement is accepted, resulting in the setting of the FIQ handler executing logic 265, and of the return of an acknowledgement accepted signal to the appropriate processor. This will cause the setting of the mask logic 920, preventing any further signal being issued to the handshake logic to indicate that a fast interrupt request is waiting. Accordingly, any subsequent acknowledgement signals received will result in the FIQServed signal being returned to the relevant processor, to reject the acknowledgement signal.

Hence it can be seen that, once a processor has been accepted to handle the fast interrupt request, no more fast request signals will be issued to the processors, and any acknowledgement signals received thereafter from the processors will be rejected. Whilst new fast interrupt requests can be issued from the logic 200 to the FIQ status register 910, the mask logic 920 will prevent the handshaking logic receiving any signal indicating that fast interrupt requests are awaiting processing, and the mask logic 900 will prevent any further request signals being issued.

Instead, during running of the fast interrupt handler by the accepted processor, the processor will access the FIQ status register 910 in order to identify the fast interrupt request(s) to be handled, and hence determine what functions need performing. When the processor has dealt with all of the fast interrupt requests in the status register 910, then the FIQ handler executing logic 265 is cleared, for example under software control, thereby removing the masking function of mask logic 900 and mask logic 920, such that any subsequent fast interrupt request propagated from the logic 200 will cause request signals to again be issued to the processors, with the processor associated with the first received acknowledgement signal being allocated to the task of servicing the fast interrupt request.

Figure 9:
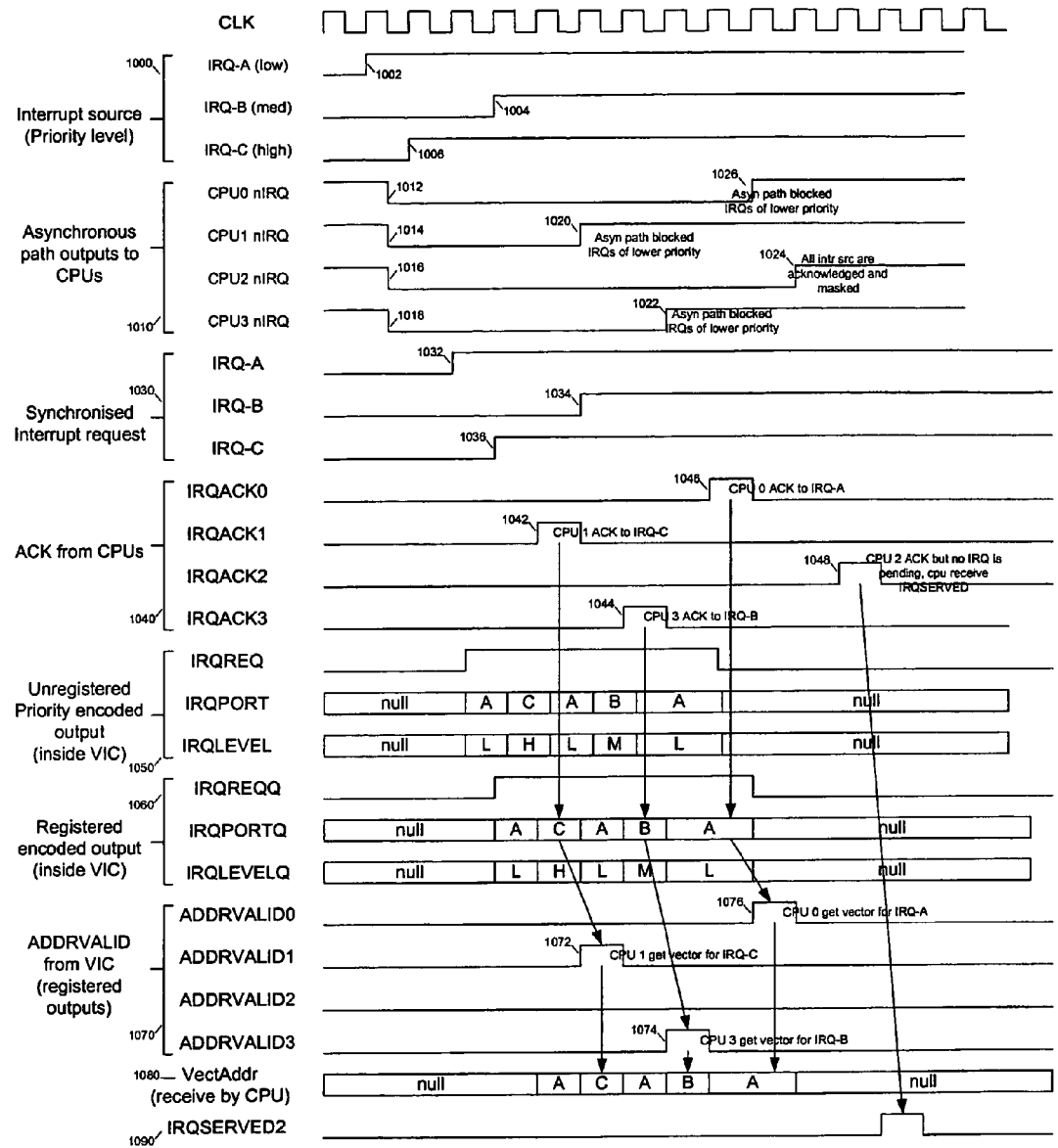
FIGS. 9 to 11 are timing diagrams illustrating the handling of interrupt requests by the interrupt controller in different situations.

FIG. 9 is a timing diagram illustrating the sequence of signals issued by the interrupt controller of one embodiment of the present invention in order to process normal interrupt requests. The signals 1000 show the time at which interrupt requests from particular interrupt sources are asserted, these signals corresponding to the signals issued from the logic 200 of FIG. 3. As can be seen from FIG. 9, in this example, an interrupt request 1002 from interrupt source A, having a low priority, is asserted followed by a high priority interrupt request 1006 from interrupt source C, followed a medium priority interrupt request 1004 from interrupt source B. Initially, all processors are available for handling interrupt requests, and accordingly four request signals 1012, 1014, 1016, 1018 are issued from the request logic 310, 312, 214, 316 associated with each processor (see FIG. 3).

The synchronised interrupt requests 1032, 1034, 1036 are produced directly from the corresponding interrupt requests 1002, 1004, 1006 output from the logic 200, these synchronised interrupt requests corresponding to the signal passed between the logic 340 and the masking logic 345 of the priority encoding circuit 205 illustrated in FIG. 3.

The acknowledgement signals 1040 associated with the CPUs are received by the corresponding handshake units within the handshaking circuit 215 of FIG. 3, and as can be seen from FIG. 9, the first acknowledgement signal to be received is the acknowledgement signal 1042 associated with CPU1.

The unregistered priority encoded output signals 1050 are those output by the priority encoding tree 350 of FIG. 3, whilst the registered encoded output signals 1060 are those output from the register 355 of the priority encoding circuit 205 of FIG. 3, these signals being the signals issued to the handshaking circuit 215. Accordingly, at the time the first acknowledgement signal 1042 is received, the IRQREQQ signal is asserted indicating that there is an unserviced interrupt request to be handled, the IRQPORTQ signal indicates that the interrupt request from interrupt source C is the highest priority interrupt request and the IRQLEVELQ signal indicates that it is a high priority interrupt request. Accordingly, this first acknowledgement signal 1042 is accepted, and results in the address valid signal 1072 being issued from the handshaking logic 510 (see FIG. 4) associated with CPU1. At the same time, the vector address 1080 issued by the vector address output circuit 710 of FIG. 5 to CPU1 will identify the interrupt service routine for interrupt source C.

The next acknowledgement signal received is the acknowledgement signal 1044 associated with CPU3. At the time this signal is received, the IRQREQQ signal is still high, indicating that an unserviced interrupt request is available for handling, with the IRQPORTQ signal indicating that the highest priority unserviced interrupt request is that from interrupt source B. Accordingly the receipt of this acknowledgement signal results in the generation of an address valid signal 1074 to CPU3 from the handshake logic 530 (see FIG. 4). Additionally, at this time, the vector address 1080 received by CPU3 will identify the interrupt service routine for interrupt source B.

The third acknowledgement signal received is acknowledgement signal 1046 associated with CPU0, upon receipt of which the handshake unit will determine that again there is an unserviced interrupt request, namely that from interrupt source A, to be serviced, and accordingly this will result in the generation of the address valid signal 1076 from the handshake unit 500 to CPU0. At this time, the vector address 1080 received by CPU0 will identify the interrupt service routine for interrupt source A.

When the fourth acknowledgement signal 1048 is received from CPU2, the IRQREQQ signal will be low indicating that there are no unserviced interrupt requests, and accordingly this will result in the generation of the IRQSERVED signal 1090 from the handshake unit 520 (see FIG. 4) to CPU2, to indicate that the acknowledgement signal has been rejected.

Looking now at the signals 1010 output to the CPUs from the request logic, it can be seen that when the acknowledgement signal 1042 is accepted by CPU1, this results in the blocking 1020 of the request signal in connection with any lower priority interrupt requests (i.e. the requests from interrupt sources A and B). Similarly, when the acknowledgement 1044 associated with CPU3 is accepted, this results in the blocking 1022 of the issue of request signals to CPU3 in connection with any lower priority interrupt requests (i.e. interrupt request A). Again, when the acknowledgement signal 1046 associated with CPU0 is accepted, this results in the blocking 1026 of request signals to be issued in connection with any lower priority interrupt requests. At this point, as all pending interrupt requests have been acknowledged and accepted, the request signals from CPU2 are also blocked 1024, as there are no further interrupt requests to be processed.

Figure 10:
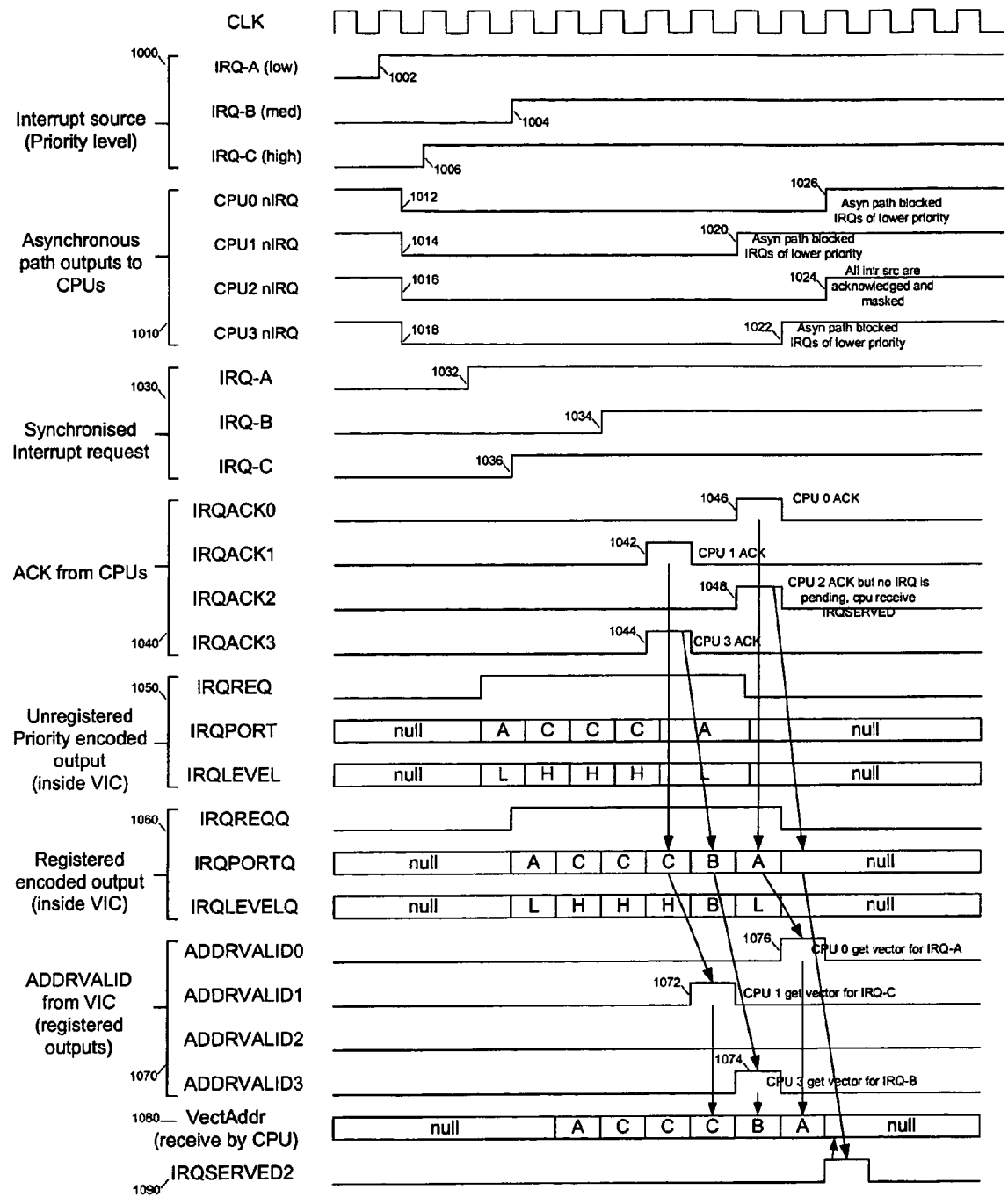

FIG. 10 shows similar timing diagram, but illustrates what happens in the event of receipt of two simultaneous acknowledgements. As can be seen from FIG. 10, the sequence of issuance of interrupt requests is the same, but in this example acknowledgement 1042 associated with CPU1 is received at the same time as acknowledgement 1044 associated with CPU3. As will be appreciated from the earlier description of FIG. 4, this results in the acknowledgement signal from CPU1 being accepted in preference to the acknowledgement signal from CPU3, thereby resulting in the address valid signal 1072 being issued to CPU1. In the next clock cycle, the acknowledgement from CPU3 can then be processed, and given that there is still an unserviced interrupt request that can be handled by CPU3, this results in the acceptance of that acknowledgement signal, and the consequential issue of the address valid signal 1074 to CPU3.

As then shown in FIG. 10, the acknowledgement 1046 associated with CPU0 is also received at the same time as the acknowledgement 1048 from CPU2. Again, given the earlier description of FIG. 4, this will result in the acknowledgement from CPU0 being accepted in preference to the acknowledgement from CPU2, thereby resulting in the issue of the address valid signal 1076 to CPU0. In the next cycle, the acknowledgement from CPU2 can be considered, but as there are no longer any unserviced interrupt requests, this will result in the generation of the IRQSERVED signal 1090 to CPU2, to reject the acknowledgement signal.

Figure 11:
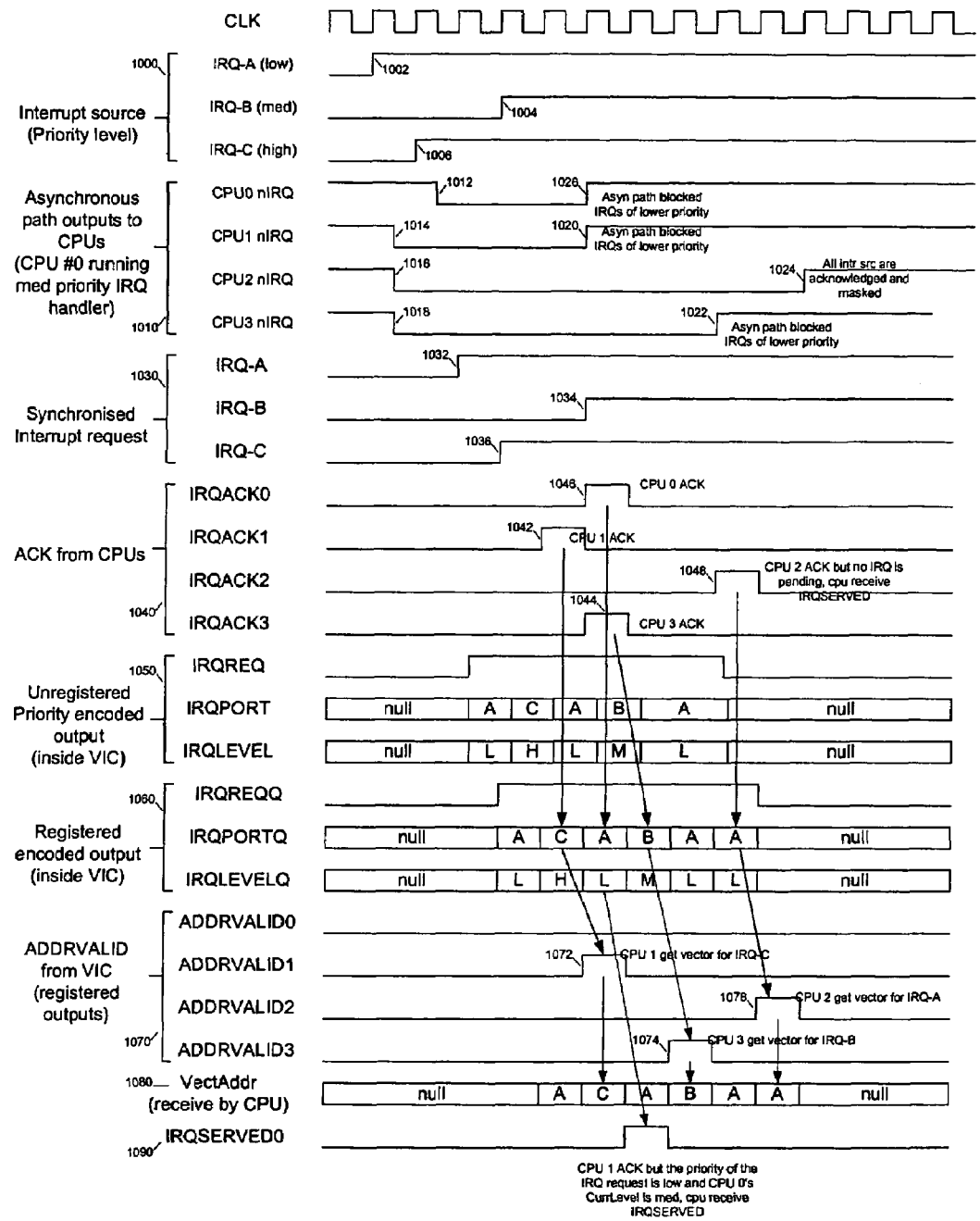

FIG. 11 illustrates a similar timing diagram, but in a situation where an acknowledgement from a particular processor, in this example CPU0, cannot automatically be accepted if there is an unserviced interrupt request awaiting processing. As can be seen from FIG. 11, the issue of interrupt requests is the same as in the previous two figures, but at the time the interrupt request from source A is issued, CPU0 is already running an interrupt request handler for a medium priority interrupt request, and accordingly is not a candidate processor for dealing with the low priority interrupt request from source A. Accordingly, the interrupt requests are initially only output to CPUs 1, 2 and 3. However, following issuance of the high priority interrupt request 1006 from interrupt source C, a request signal 1012 is also issued to CPU0, as this interrupt request has a higher priority than the interrupt request currently being handled by CPU0.

As in FIG. 9, the first acknowledgement 1042 received is associated with CPU1, and accordingly CPU1 gets allocated the task of servicing the interrupt request from interrupt source C. Subsequently, an acknowledgement signal 1046 associated with CPU0 is received simultaneously with an acknowledgement signal 1044 from CPU3. Given the earlier discussion of FIG. 4, it will be appreciated that the acknowledgement from CPU0 effectively blocks from consideration the acknowledgement from CPU3. However, the available unserviced interrupt request is the interrupt request from interrupt source A, and this has a lower priority than the interrupt request currently being serviced by CPU0. This will be detected by the compare logic 585 of the handshake unit 500 discussed earlier with reference to FIG. 4, and will prevent generation of the acceptance signal. Instead, an IRQSERVED signal will be issued to CPU0 to reject the acknowledgement signal. In the next cycle, the acknowledgement from CPU3 can be considered, and this will result in the allocation of the interrupt request from interrupt source B to CPU3 via generation of the address valid signal 1074.

When the acknowledgement signal 1048 from CPU2 is subsequently received, this will then result in the address valid signal 1078 being issued to CPU2 to allocate to CPU2 the servicing of the interrupt request from interrupt source A.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An interrupt controller for processing interrupt requests in a system having a plurality of data processing units operable to service those interrupt requests, each interrupt request having an associated priority level, the interrupt controller comprising:
    request logic operable to receive an indication of unserviced interrupt requests, to apply predetermined criteria to determine which of said plurality of data processing units are candidate data processing units for servicing at least one of said unserviced interrupt requests, and to issue a request signal only to each said candidate data processing unit;
    priority encoding logic operable to determine a highest priority unserviced interrupt request based on the associated priority levels of the unserviced interrupt requests; and
    handshake logic for receiving acknowledgement signals associated with said candidate data processing units replying to said request signals issued by the request logic, and, upon receipt of a first acknowledgement signal, for allocating to the candidate data processing unit associated with said first acknowledgement signal the highest priority unserviced interrupt request as indicated by the priority encoding logic.

2. An interrupt controller as claimed in claim 1, wherein at least one of said candidate data processing units is operable to reply to said request signal by issuing a direct acknowledgement signal for receipt as one of said acknowledgement signals by the handshake logic.

3. An interrupt controller as claimed in claim 1, wherein at least one of said candidate data processing units is operable to reply to said request signal by issuing to the interrupt controller an enquiry signal seeking identification of an interrupt service routine to be executed, the interrupt controller further comprising an indirect acknowledgement signal generator operable to determine which data processing unit any such enquiry signal has been issued from, and to generate an indirect acknowledgement signal associated with that data processing unit for receipt as one of said acknowledgement signals by the handshake logic.

4. An interrupt controller as claimed in claim 3, further comprising a register block having a number of identifier registers operable to store the identification of an interrupt service routine to be executed, one identifier register being provided for each of said data processing units that may reply to said request signal by issuing to the interrupt controller said enquiry signal, the indirect acknowledgement signal generator being operable to determine which data processing unit said enquiry signal has been issued from by determining the identifier register specified by that enquiry signal.

5. An interrupt controller as claimed in claim 1, wherein said handshake logic comprises a plurality of handshake units, each handshake unit being operable to receive an acknowledgement signal associated with a corresponding one of said data processing units, the handshake units being allocated relative priorities such that if more than one acknowledgement signal is received by the handshake logic at the same time, the acknowledgement signal received by the handshake unit with the higher priority is treated as the first acknowledgement signal.

6. An interrupt controller as claimed in claim 5, wherein the plurality of handshake units are interconnected in a daisy chain arrangement in order to implement the relative priorities, such that if more than one acknowledgement signal is received by the handshake logic at the same time, the processing of the acknowledgement signals received by other than the handshake unit with the higher priority is delayed.

7. An interrupt controller as claimed in claim 1, wherein if at the time an acknowledgement signal associated with a candidate data processing unit is processed by the handshake logic, no unserviced interrupt requests that could be serviced by that candidate data processing unit exist, the handshake logic is operable to issue a reject signal.

8. An interrupt controller as claimed in claim 7, wherein if that candidate data processing unit had replied to said request signal by issuing a direct acknowledgement signal received as one of said acknowledgement signals by the handshake logic, the reject signal issued by the handshake logic is routed to that candidate data processing unit to indicate that the direct acknowledgement signal is rejected.

9. An interrupt controller as claimed in claim 7, wherein if that candidate data processing unit had replied to said request signal by issuing to the interrupt controller an enquiry signal seeking identification of an interrupt service routine to be executed, the reject signal issued by the handshake unit is used to cause a default interrupt service routine to be identified to that data processing unit which when executed by that data processing unit will cause that data processing unit to return to its state that existed prior to responding to the request signal.

10. An interrupt controller as claimed in claim 1, wherein the predetermined criteria applied by the request logic comprises a determination as to whether each data processing unit is currently servicing an interrupt request whose priority level is the same or higher than the priority level of the highest priority of said unserviced interrupt requests, the candidate data processing units being determined to be any of said data processing units that are not currently servicing such an interrupt request.

11. An interrupt controller as claimed in claim 1, wherein the request logic comprises a plurality of request units, each request unit being associated with one of said data processing units and being operable to control issuance of the request signal to that data processing unit in dependence on the predetermined criteria.

12. An interrupt controller as claimed in claim 11, wherein each request unit comprises priority level masking logic operable to receive said indication of unserviced interrupt requests and a current priority level of an interrupt request currently being serviced by the associated data processing unit, and to prevent the request signal being issued to the associated data processing unit only if none of said unserviced interrupt requests has a priority level which is higher than the current priority level.

13. An interrupt controller as claimed in claim 1, wherein the interrupt requests are generated by a plurality of interrupt sources, and the priority levels associated with each interrupt request are dependent on the interrupt source from which that interrupt request is generated.

14. An interrupt controller as claimed in claim 13, further comprising an interrupt source interface operable to receive the interrupt requests from the interrupt sources and to determine as the unserviced interrupt requests any received interrupt requests from interrupt sources which are not currently having an interrupt request serviced by one of said data processing units.

15. An interrupt controller as claimed in claim 14, further comprising current servicing interrupts logic coupled to the handshake logic and operable to record which interrupt sources have interrupt requests currently being serviced by one of said data processing units, the current servicing interrupts logic being operable to be updated each time the handshake logic allocates one of said unserviced interrupts to one of said candidate data processing units, and each time the servicing of an interrupt request is completed by one of said data processing units.

16. An interrupt controller as claimed in claim 15, wherein said priority encoding logic comprises masking logic operable to receive an indication of which interrupt sources have interrupt requests currently being serviced by one of said data processing units, and to mask from consideration in the determination of the highest priority unserviced interrupt request any unserviced interrupt requests from those interrupt sources.

17. An interrupt controller as claimed in claim 13, further comprising priority stack pop control logic having a storage identifying for each interrupt source which data processing unit, if any, is servicing an interrupt request from that interrupt source, the storage being updated each time the handshake logic allocates one of said unserviced interrupts to one of said candidate data processing units, and each time the servicing of an interrupt request is completed by one of said data processing units.

18. An interrupt controller as claimed in claim 17, wherein the handshake logic comprises a plurality of handshake units, each handshake unit being operable to receive an acknowledgement signal associated with a corresponding one of said data processing units, and each handshake unit having a priority stack identifying the priority level of the interrupt request currently being serviced by the corresponding data processing unit, each priority stack's pop operation being controlled by the priority stack pop control logic.

19. An interrupt controller as claimed in claim 1, wherein the request logic has access to a status field associated with each of said data processing units and operable to indicate whether the associated data processing unit is enabled for interrupts, the indication provided by each such status field being referenced when applying said predetermined criteria.

20. An interrupt controller as claimed in claim 1, wherein the request logic is asynchronous logic, thereby enabling the requests signals to be issued to each candidate data processing unit even if a system clock is turned off.

21. An interrupt controller as claimed in claim 1, wherein the handshake logic is operable to allocate an unserviced interrupt request to one of said candidate data processing units by issuing an address valid signal, and causing an address to be issued to the candidate data processing unit identifying a service routine to be executed by the data processing unit to service that interrupt request.

22. An interrupt controller as claimed in claim 1, wherein the interrupt controller is further operable to process fast interrupt requests, such fast interrupt requests being of a different interrupt type to said interrupt requests and having no priority level associated therewith, the interrupt controller comprising:
additional request logic operable to receive an indication of unserviced fast interrupt requests, and to issue a fast request signal to each of said data processing units;
additional handshake logic operable to receive fast acknowledgement signals associated with said data processing units replying to said fast request signals issued by the additional request logic, upon receipt of a first fast acknowledgement signal, the additional handshake logic being operable to allocate to the data processing unit associated with that first fast acknowledgement signal the unserviced fast interrupt requests, and to prevent the additional request logic from issuing any further fast request signals.

23. A method of processing interrupt requests in a system having a plurality of data processing units operable to service those interrupt requests, each interrupt request having an associated priority level, the method comprising the steps of:
(a) upon receiving an indication of unserviced interrupt requests, applying predetermined criteria to determine which of said plurality of data processing units are candidate data processing units for servicing at least one of said unserviced interrupt requests;
(b) issuing a request signal only to each said candidate data processing unit;
(c) determining a highest priority unserviced interrupt request based on the associated priority levels of the unserviced interrupt requests; and
(d) receiving acknowledgement signals associated with said candidate data processing units replying to said request signals issued by the request logic, and, upon receipt of a first acknowledgement signal, allocating to the candidate data processing unit associated with said first acknowledgement signal the highest priority unserviced interrupt request.

24. A method as claimed in claim 23, wherein at least one of said candidate data processing units is operable to reply to said request signal by issuing a direct acknowledgement signal for receipt as one of said acknowledgement signals.

25. A method as claimed in claim 23, wherein at least one of said candidate data processing units is operable to reply to said request signal by issuing an enquiry signal seeking identification of an interrupt service routine to be executed, the method further comprising the steps of:
determining which data processing unit any such enquiry signal has been issued from; and
generating an indirect acknowledgement signal associated with that data processing unit for receipt as one of said acknowledgement signals.

26. A method as claimed in claim 23, wherein the acknowledgements signals are received by a handshake logic comprising a plurality of handshake units, each handshake unit being operable to receive an acknowledgement signal associated with a corresponding one of said data processing units, the method further comprising the step of allocating relative priorities to the handshake units such that if more than one acknowledgement signal is received by the handshake logic at the same time, the acknowledgement signal received by the handshake unit with the higher priority is treated as the first acknowledgement signal.

27. A method as claimed in claim 23, wherein if at the time an acknowledgement signal associated with a candidate data processing unit is processed, no unserviced interrupt requests that could be serviced by that candidate data processing unit exist, the method comprises the further step of issuing a reject signal.

28. A method as claimed in claim 27, wherein if that candidate data processing unit had replied to said request signal by issuing a direct acknowledgement signal received as one of said acknowledgement signals, the method comprises the step of routing the reject signal to that candidate data processing unit to indicate that the direct acknowledgement signal is rejected.

29. A method as claimed in claim 27, wherein if that candidate data processing unit had replied to said request signal by issuing an enquiry signal seeking identification of an interrupt service routine to be executed, the method comprises the step of using the reject signal to cause a default interrupt service routine to be identified to that data processing unit which when executed by that data processing unit will cause that data processing unit to return to its state that existed prior to responding to the request signal.

30. A method as claimed in claim 23, wherein the predetermined criteria applied at said step (a) comprises a determination as to whether each data processing unit is currently servicing an interrupt request whose priority level is the same or higher than the priority level of the highest priority of said unserviced interrupt requests, the candidate data processing units being determined to be any of said data processing units that are not currently servicing such an interrupt request.

31. A method as claimed in claim 23, wherein the interrupt requests are generated by a plurality of interrupt sources, and the priority levels associated with each interrupt request are dependent on the interrupt source from which that interrupt request is generated.

32. A method as claimed in claim 31, further comprising the steps of:
receiving the interrupt requests from the interrupt sources; and
determining as the unserviced interrupt requests any received interrupt requests from interrupt sources which are not currently having an interrupt request serviced by one of said data processing units.

33. A method as claimed in claim 31, further comprising:
maintaining in a storage an identification for each interrupt source of which data processing unit, if any, is servicing an interrupt request from that interrupt source; and
updating the storage each time one of said unserviced interrupts is allocated to one of said candidate data processing units, and each time the servicing of an interrupt request is completed by one of said data processing units.

34. A method as claimed in claim 33, wherein the acknowledgements signals are received by a handshake logic comprising a plurality of handshake units, each handshake unit being operable to receive an acknowledgement signal associated with a corresponding one of said data processing units, and each handshake unit having a priority stack identifying the priority level of the interrupt request currently being serviced by the corresponding data processing unit, the method further comprising the step of controlling each priority stack's pop operation in accordance with the content of said storage.

35. A method as claimed in claim 23, wherein at said step (d) the allocation of an unserviced interrupt request to one of said candidate data processing units is performed by issuing an address valid signal, and causing an address to be issued to the candidate data processing unit identifying a service routine to be executed by the data processing unit to service that interrupt request.

36. A method as claimed in claim 23, further including the processing of fast interrupt requests, such fast interrupt requests being of a different interrupt type to said interrupt requests and having no priority level associated therewith, the method further comprising the steps of:
receiving an indication of unserviced fast interrupt requests;
issuing a fast request signal to each of said data processing units;
receiving fast acknowledgement signals associated with said data processing units replying to said fast request signals issued by the additional request logic, and upon receipt of a first fast acknowledgement signal, allocating to the data processing unit associated with that first fast acknowledgement signal the unserviced fast interrupt requests; and
preventing any further fast request signals being issued.

* * * * *